(12) United States Patent     (10) Patent No.:   US 12,632,532 B2

Holly, Jr. et al.     (45) Date of Patent:   *May 19, 2026

(54) SYSTEM AND METHOD FOR AUTO-PROVISIONING AI-BASED DIALOG SERVICE

(71) Applicant: Nextiva, Inc., Scottsdale, AZ (US)

(72) Inventors: Gerald A. Holly, Jr., Parkland, FL (US); Edwin K. Margulies, Clifton, TX (US); Namir Sincoff-Yedid, San Diego, CA (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,804

(22) Filed: Mar. 8, 2023

(65) Prior Publication Data

US 2023/0222199 A1     Jul. 13, 2023

Related U.S. Application Data

(63) Continuation of application No. 16/430,245, filed on Jun. 3, 2019, now Pat. No. 11,620,371.

(Continued)

(51) Int. Cl.
*G06F 16/951*     (2019.01)
*G06F 16/9032*     (2019.01)
(Continued)

(52) U.S. Cl.
CPC ........ *G06F 21/41* (2013.01); *G06F 16/90332* (2019.01); *G06F 16/9035* (2019.01);
(Continued)

(58) Field of Classification Search
CPC ........... G06F 16/90332; G06F 16/9035; G06F 16/951
See application file for complete search history.

(56) References Cited

U.S. PATENT DOCUMENTS 8,477,926 B2   7/2013   Jasper et al.
8,891,744 B2   11/2014   Jasper et al.
(Continued)

FOREIGN PATENT DOCUMENTS

JP     6054288 B2   12/2016

OTHER PUBLICATIONS

European Patent Office, Search Report for Application No. 19823103. 7, Jan. 31, 2022, 8 pages.

*Primary Examiner* — Khanh B Pham
(74) *Attorney, Agent, or Firm* — Spencer Fane LLP; Steven J. Laureanti

(57) ABSTRACT

A method of auto-provisioning AI-based dialog services for a plurality of target applications includes storing a plurality of dialog templates, generating a deployment object associating one or more of the dialog templates with a target application from among the plurality of target applications, extracting textual data from the target application, assembling the extracted textual data into inquiries or inquiry responses according to the one or more dialog templates associated with the deployment object, and deploying an AI-based dialog service to the target application based on the assembled inquiries or inquiry responses. Each of the dialog templates may include one or more sets of common inquiries or common inquiry responses.

18 Claims, 10 Drawing Sheets

Related U.S. Application Data

(60) Provisional application No. 62/686,212, filed on Jun. 18, 2018.

(51) Int. Cl.

| | |
|---|---|
| *G06F 16/9035* | (2019.01) |
| *G06F 21/41* | (2013.01) |
| *G06F 40/10* | (2020.01) |
| *G06N 20/00* | (2019.01) |

(52) U.S. Cl.

CPC ............ *G06F 16/951* (2019.01); *G06F 40/10* (2020.01); *G06N 20/00* (2019.01)

(56) References Cited

U.S. PATENT DOCUMENTS

| | | | |
|---|---|---|---|
| 9,137,368 B2 | 9/2015 | Jasper et al. | |
| 9,143,907 B1 | 9/2015 | Caldwell et al. | |
| 10,762,438 B1 | 9/2020 | Zhang | |
| 2005/0154723 A1 | 7/2005 | Liang | |
| 2014/0122619 A1 | 5/2014 | Duan | |
| 2014/0164296 A1 | 6/2014 | Duan | |
| 2014/0201729 A1* | 7/2014 | Smith | G06F 8/38 |
| | | | 717/173 |
| 2014/0272909 A1* | 9/2014 | Isensee | G09B 7/02 |
| | | | 434/362 |
| 2014/0344674 A1 | 11/2014 | Zhu | |
| 2015/0186515 A1* | 7/2015 | Rao | G06F 16/951 |
| | | | 707/610 |
| 2015/0201075 A1 | 7/2015 | Fan et al. | |
| 2016/0062959 A1 | 3/2016 | Feng | |
| 2017/0344532 A1 | 11/2017 | Zhou et al. | |
| 2018/0075335 A1* | 3/2018 | Braz | G06F 16/24522 |
| 2018/0157960 A1* | 6/2018 | Holmes | G06N 7/01 |
| 2018/0332042 A1 | 11/2018 | Yu | |
| 2019/0104092 A1 | 4/2019 | Koohmarey | |
| 2019/0130463 A1* | 5/2019 | Bolla | G06Q 20/384 |
| 2019/0303412 A1* | 10/2019 | Ray | G06F 40/169 |

* cited by examiner

| FIG. 2A | FIG. 2B |
|---------|---------|

| FIG. 3A | FIG. 3B |
|---------|---------|
|         |         |

| | |
|---|---|
| FIG. 4A | FIG. 4B |

| FIG. 5A | FIG. 5B |
|---------|---------|

600

| DEPLOYMENT OBJECT ID | USER / SUBSCRIBER ID | TARGET APPLICATION CREDENTIALS / TOKENS | DIALOG TEMPLATE DATA | FAQ DATA | COMMUNICATION CHANNEL DATA | NOTIFICATION / ESCALATION DATA | SCHEDULING DATA | CRAWLER DATA / TRAINING CORPUS |
|---|---|---|---|---|---|---|---|---|
| 610 | 620 | 630 | 640 | 650 | 660 | 670 | 680 | 690 |
| | | | | | | | | |
| | | | | | | | | |
| · · · | · · · | · · · | · · · | · · · | · · · | · · · | · · · | · · · |
| | | | | | | | | |

FIG. 6

SYSTEM AND METHOD FOR AUTO-PROVISIONING AI-BASED DIALOG SERVICE

CROSS-REFERENCE TO RELATED APPLICATIONS

This application is a continuation of U.S. application Ser. No. 16/430,245 filed Jun. 3, 2019, which relates to and claims the benefit of U.S. Provisional Application No. 62/686,212 filed Jun. 18, 2018 and entitled "SYSTEM AND METHOD FOR AUTO-PROVISIONING TIMELINE DIALOGS," the entire disclosures of which are hereby wholly incorporated by reference.

STATEMENT RE: FEDERALLY SPONSORED RESEARCH/DEVELOPMENT

Not Applicable

BACKGROUND

1. Technical Field

The present disclosure relates to chat bots and other artificial intelligence-based dialog services and, more particularly, to the automatic provisioning of voice or text-based dialogs between human beings and machines on a plurality of platforms including social engagement timelines, smart phone applications, and web sites.

2. Related Art

The rate of adoption of automated customer service and sales software has accelerated over the past decade. Automation between humans and machines has been growing since the introduction of ATM machines in 1969 by Chemical Bank. Since that time, other means to automate customer service and sales transactions have been pervasive and popular. Starting in the 1970s, the introduction of phone-based IVR (Interactive Voice Response) met with little resistance from enterprises who wanted to "deflect" live phone calls from expensive live agent-based contact centers.

Modern uses of automation technology include so-called chat bots, ecommerce sites, and AI-based transactional systems. An example of an AI-based transactional system is Google Assistant or Amazon Alexa to name a few.

The primary motivation for small or large companies to automate dialogs and transactions between their companies and their human customers is to save money. The cost of contact center infrastructure, and its employees who act as "agents" or customer service representatives, is daunting. It is not uncommon for the cost of a long customer service call to be twenty dollars or more accounting for cost of carriage, infrastructure, hourly wages and benefits. On the other hand, a complex transaction that may cost twenty dollars or more with human intervention can be handled in an automated way for under a dollar. It is therefore no surprise that, according to the Deloitte 2017 Global Contact Center Survey Results, 33% of managers who operate contact centers plan to invest in robotics and process automation in the next 2 years.

To the dismay of many enterprises who have explored the idea of automating dialogs on web sites, mobile smart phone applications and Facebook Business Pages, for example, the cost of initial deployment is often insurmountable. Ironically, even though the end result of deploying a "chat bot"

is in fact some level of automation, the deployment of same is nowhere near automatic. At present, the state of the art in bot or other automation deployments is almost completely manual. That is to say that both consulting and technical professional services are required to deploy an automation system.

A typical deployment starts with a discovery process in which a team of consultants will meet with the enterprise to identify "automation targets." Once suitable targets and use cases are ascertained, a thorough review of existing dialogs, best practices, best answers to questions and persona development happen. All of this discovery is very expensive, with some engagements costing hundreds of thousands of dollars. Add to this the cost of programming bots or other automation apparatus, and it is common to have spent upwards of half a million dollars or more to deploy an automation system.

Most enterprises cannot afford such full-blown discovery and technical professional services engagements. Often, they settle for cheap and easy deployments of so-called chat-bots that do little to solve customer problems and are limited in the scope of what they can answer with any accuracy or depth. The result is a burgeoning sea of web-based robots that offer little help at all.

Further exacerbating the cost of automation projects is the length of time and effort to deploy. It is not uncommon for a project to stretch out into four or five months and some have taken over a year to deploy. Of course, this depends on the depth and complexity of the automation targeted. This problem of cost and time are particularly vexing for smaller companies who simply cannot afford multi-month professional service-based projects.

Lastly, the cost of maintaining, upgrading and "re-training" AI-based and automation systems is high. Many vendors offer a retainer for "re-training" of bots or insist on a quarterly "tune-up" to improve on a program's ability to answer questions properly and to keep the AI corpus relevant.

These problems combined add up to a serious problem for those enterprises who seek to automate transactions for their customers. In summary, most enterprises simply do not have the time or money to pay for automation. Ironically, the deployment of automation systems is simply not automatic. It is fraught with manually-intensive and expensive work.

BRIEF SUMMARY

Accordingly, aspects of the present disclosure provide significant operational and technical advantages that solve one or more of the problems listed above. One aspect of the embodiments of the present disclosure is a system having the ability to provide automated provisioning for the deployment of AI-based dialog services (e.g. chat bots) without manual intervention. A developer of chat bots or other automation platforms may be familiar with the body of work involved in cobbling together AI engines, proprietary applications, custom subroutines, and third-party integrations to create a viable automation system. This work is complicated and takes a long time to achieve the end result of automation. In this regard, the disclosed system removes much of the manual work and programming required to automate dialog between humans and machines. In a preferred embodiment, once an operator has credentialed his or her target platform against the software of the disclosed system, the system may automate all of the provisioning based on pre-programmed routines.

Another aspect of the embodiments of the present disclosure is a system having the ability to automatically interface with popular social, web, mobile, CRM, digital engagement, in-car telemetry, and contact center platforms after initial credentialization. For example, the practitioner of the disclosed system may welcome the ease of a pre-integrated automation routine for a Facebook Business Page. The practitioner does not need to learn the Facebook APIs or programming language. The practitioner does not have to create any custom software whatsoever. Instead, the disclosed system simply sets itself up to create human-to-machine dialog once the system is credentialed for that Facebook Business Page.

Another aspect of the embodiments of the present disclosure is a system having the ability to automatically "crawl" through historical dialog that is available on the target platform that is being automated. For example, the system may have the ability to search through and catalog both the questions and answers found on a particular "timeline" on a Facebook Business Page. The system may have the ability to automatically parse text, extract relevant data, and analyze frequency of use. The system can also be used to filter "found data" based on templates that define customer preferences, use cases, and relevant question and answer behavior.

Another aspect of the embodiments of the present disclosure is a system having the ability to aggregate and normalize "found data" into a workable AI-based corpus, which will be of great utility to the practitioner. In the absence of the disclosed system, the assembly of data from various sources and timelines is a largely manual task and takes a lot of time. In this aspect, the system may completely eliminate this manual step in the process of deploying a timeline-based human-to-machine dialog.

Another aspect of the embodiments of the present disclosure is a system having the ability to automatically interface and achieve "trusted status" with third-party subsystems. A practitioner with average skills will understand that retrieving and acting on credentialed deployment codes or tokens with AI subsystems may be required in order to deploy an automation system. The ability to do this credentialing in an automated way will be recognized as very useful.

Another aspect of the embodiments of the present disclosure is an automated scheduling subsystem. The automated scheduling system may eliminate the need to manually "train" the AI corpus. Instead, the scheduling system may periodically provide updates to an AI-based corpus using periodic text, application and page crawling subroutines. The scheduler may work alongside automatic update algorithms so training and re-training of AI subroutines can be done automatically. The automation may include the ability to assemble and re-assemble appropriate dialog and answers accounting for tone, personality and length of answer as appropriate for a particular target audience.

Another aspect of the embodiments of the present disclosure is an automated notification and escalation system. The automated notification and escalation system may provide enterprise operators the ability to define how the system will react and notify the operators based on data from an automated recommendations subroutine. The gateway may further have the ability to notify via a plurality of communication channels including, but not limited to, SMS, email, phone calls, and other forms of messaging.

Another aspect of the embodiments of the present disclosure is a software-based, networked system for the automatic provisioning of voice and text-based dialogs between human beings and machines or software programs. The system may include a collection of subroutines, algorithms, gateways, templates and connectivity to commonly available AI (Artificial Intelligence) substrates and target deployment platforms and may have the ability to be credentialed against a plurality of target platforms including social engagement timelines, smart phone applications, and web sites. In particular, the system may have the ability to automatically: Access historical and real time dialogs; extract relevant information from those dialogs; assemble an automated AI corpus; connect to subroutines, gateways, and essential processes; automatically deploy itself on a target platform; automatically update and "re-train" itself; and automatically provide actionable insights on user behavior and provide notifications automatically.

Another aspect of the embodiments of the present disclosure is a distributed software-based system which provides automated provisioning for the deployment of AI-based dialogs without manual intervention, the resulting dialogs of which facilitate dialog between human beings and a plurality of social site timelines or web sites equipped with the system software. Further, the system may act as loosely-coupled overlay platform, interacting with a plurality of 3rd party target platforms. Such 3rd party target platforms being comprised of smartphone applications, web-based applications, customer services CRM and contact center systems, and digital engagement systems.

The distributed software-based system may have the ability to automatically interface with a plurality target social, web, mobile, CRM, digital engagement, in-car telemetry, or contact center platforms after initial credentialization.

The distributed software-based system may have the ability to automatically parse text, extract relevant data, based on frequent use, and filter based upon customer preferences, specific customer use cases, and relevant question and answer behavior.

The distributed software-based system may have the ability to automatically assemble relevant text into a fit-for-purpose corpus of data in order to extract and assemble appropriate answers including the proper tone, personality, and length for a particular target audience.

The distributed software-based system may have the ability to interface with a plurality of AI-based subsystems for the purposes of automatically retrieving and acting on credentialed deployment codes or tokens that are further deployed automatically on a customer's chosen platform.

The distributed software-based system may include an automated scheduling subsystem the purpose of which is to periodically provide updates to an AI-based corpus using periodic text, application and page crawling subroutines. Such subroutines may work in concert with automatic update algorithms to train and re-train and re-assemble appropriate dialog and answers including the proper tone, personality and length for a particular target audience.

The distributed software-based system may include an automated ranking and weighting algorithm the purpose of which is to ensure appropriate answers are presented in priority order.

The distributed software-based system may include an automated subroutine which extracts metrics including a plurality of interactions between the system and human beings. Such metrics may include but are not limited to customer tone, personality, relevance, response time, response length, etc. Further, the automated subroutine may assemble pre-formatted template-based data that is automatically uploaded or distributed to customer business intelligent software in order to derive actionable insights.

The distributed software-based system may further include an automated recommendations subroutine which acts on extracted analytics and associated metrics and delivers specific recommendations to the operator of the system or to the customer based on pre-formatted templates.

The distributed software-based system may further include an automated notification and escalation system that reacts and performs notification and live person escalation duties based on automatic upload and distribution of data from the automated recommendations subroutine. Such notifications or escalations may be made to target endpoints defined by an administrative server. Further, the automated notification and escalation system may be triggered for use based on a plurality of inputs including, but not limited to customer sentiment, tone, number of dialog turns, or timers.

The distributed software-based system may have the ability to associate notification gateway "triggers" that automatically perform telecommunication alerts including but not limited to automated outbound SMS or text messages, email messages, Facebook Messenger messages, Google Assistant messages, phone calls, or other IM- or Chat-based messages. Such automated messages may be received by target platform operators for the purpose of monitoring the system or intervening on behalf of customers who need assistance by human or automated intervention.

The distributed software-based system may have the ability to perform real-time sentiment analysis in order to isolate customer complaints or other actionable sentiment such that the prioritization of automated responses or escalations using the notification gateway can be fully automated.

The distributed software-based system may have the ability to associate pre-formed and editable templates for the purpose defining actions, triggers, and general workflow governing the interaction between the system and third party smartphone applications, web-based applications, customer services CRM and contact center systems, and digital engagement systems using fully automated routines.

The distributed software-based system may have the ability to automatically correlate short-length language n-grams with sentence-level n-grams to assemble relevant statement sets that are subsequently assembled into appropriate machine-to-human dialogs.

The distributed software-based system may have the ability to automatically assemble machine-to-human dialogs from the system corpus pertaining to specific target operator platforms.

The distributed software-based system may have the ability to automatically generate FAQ dialog (Frequently Asked Questions and Answers) from the automatically assembled machine-to-human dialogs assembled by the system for the purposes of off-line or third-party system use.

The distributed software-based system may have the ability to automatically generate FAQ dialog in an operator-selected format. Such format can be but is not limited to text, XML, HTML, JavaScript, JSON, voice files or images. Further, the preferred format may be defined in pre-formed templates indicating the preferences of the target operator's platform.

Another aspect of the embodiments of the present disclosure is a non-transitory program storage medium on which are stored instructions executable by a processor to perform operations for auto-provisioning AI-based dialog services for a plurality of target applications. The operations may include storing a plurality of dialog templates, generating a deployment object associating one or more of the dialog templates with a target application from among the plurality of target applications, extracting textual data from the target application, assembling the extracted textual data into inquiries or inquiry responses according to the one or more dialog templates associated with the deployment object, and deploying an AI-based dialog service to the target application based on the assembled inquiries or inquiry responses. Each of the dialog templates may include one or more sets of common inquiries or common inquiry responses.

The deployment object may further associate login credentials with the target application. Deploying the AI-based dialog service may include accessing the target application using the login credentials associated with the deployment object. Accessing the target application using the login credentials may include requesting an access token from the target application. The deployment object may further associate an access token received from the target application with the target application.

Extracting the textual data from the target application may include deploying a crawler to the target application. The deployment object may further associate crawler scheduling information with the target application. The crawler may be deployed according to the crawler scheduling information associated with the deployment object. The operations may further include updating the assembled inquiries or inquiry responses based on subsequently extracted textual data from the target application, the subsequently extracted textual data obtained by the crawler according to the crawler scheduling information associated with the deployment object. The operations may further include updating the AI-based dialog service based on the updated assembled inquiries or inquiry responses.

Assembling the extracted textual data into inquiries or inquiry responses may include assembling the textual data based on one or more attributes selected from the group consisting of: a tone or sentiment of the inquiry or inquiry response, a personality associated with the inquiry or inquiry response, a relevance of the inquiry or inquiry response, a length of the inquiry or inquiry response, a response time of the inquiry or inquiry response, and a target audience of the AI-based dialog service.

Assembling the extracted textual data into inquiries or inquiry responses may include ranking and weighting the assembled textual data to ensure appropriate dialog answers are presented in priority order.

Assembling the extracted textual data into inquiries or inquiry responses may include correlating short-length language n-grams with sentence-level n-grams to assemble relevant statement sets.

Deploying the AI-based dialog service may include feeding the assembled inquiries or inquiry responses to a discovery service and receiving a deployment code of the AI-based dialog service from an assistant/bot service connected to the discovery service.

The deployment object may further associate analytics scheduling information with the target application. The operations may further include deriving analytics from the extracted textual data according to the analytics scheduling information associated with the deployment object. The operations may further include rendering a report based on the derived analytics according to the analytics scheduling information associated with the deployment object.

The deployment object may further associate notification or escalation data with the target application, the notification or escalation data including one or more notification or escalation triggers and one or more notification or escalation target endpoints. The operations may further include issuing a notification or escalation to the one or more notification or escalation target endpoints according to the notification or escalation data associated with the deployment object. The one or more notification or escalation triggers may comprise values of inputs selected from the group consisting of: customer sentiment, customer tone, number of dialog turns, and timers. The notification or escalation target endpoints may comprise automated outbound communications selected from the group consisting of short message service messages, text messages, instant messages, chat messages, virtual assistant messages, email messages, and phone calls.

The operations may further include generating a Frequently Asked Questions and Answers (FAQ) dialog based on the assembled inquiries or inquiry responses. The deployment object may further associate FAQ preference data with the target application, the FAQ preference data including a preferred format for an automatically generated FAQ. The FAQ dialog may be generated according to the FAQ preference data.

The target application may include a smartphone application, a web-based application, a customer relationship management system, a contact center system, a digital engagement platform, a social engagement timeline, or an in-car telemetry system.

Another aspect of the embodiments of the present disclosure is a method of auto-provisioning AI-based dialog services for a plurality of target applications. The method may include storing a plurality of dialog templates, generating a deployment object associating one or more of the dialog templates with a target application from among the plurality of target applications, extracting textual data from the target application, assembling the extracted textual data into inquiries or inquiry responses according to the one or more dialog templates associated with the deployment object, and deploying an AI-based dialog service to the target application based on the assembled inquiries or inquiry responses. Each of the dialog templates may include one or more sets of common inquiries or common inquiry responses.

Another aspect of the embodiments of the present disclosure is a system for auto-provisioning AI-based dialog services for a plurality of target applications. The system may include a template server for storing a plurality of dialog templates and generating a deployment object associating one or more of the dialog templates with a target application from among the plurality of target applications, a crawler for extracting textual data from the target application, an algorithm server for assembling the extracted textual data into inquiries or inquiry responses according to the one or more dialog templates associated with the deployment object, and a provisioning server for deploying an AI-based dialog service to the target application based on the assembled inquiries or inquiry responses. Each of the dialog templates may include one or more sets of common inquiries or common inquiry responses.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 diagrammatically depicts the arrangement of FIGS. 2A and 2B, of which FIG. 2A shows a first part of a process or logic flow for credentialization and provisioning and FIG. 2B shows a second part of the process;

FIG. 3 diagrammatically depicts the arrangement of FIGS. 3A and 3B, of which FIG. 3A shows a first part of a process or logic flow for auto-crawling, bot deployment, scheduling, and training

FIG. 4 diagrammatically depicts the arrangement of FIGS. 4A and 4B, of which FIG. 4A shows a first part of a process or logic flow for analytics and reports and FIG. 4B shows a second part of the process;

FIG. 5 diagrammatically depicts the arrangement of FIGS. 5A and 5B, of which FIG. 5A shows a first part of a process or logic flow for escalation and notification and FIG. 5B shows a second part of the process; and FIG. 6 shows an example data structure for auto-provisioning AI-based dialog services.

DETAILED DESCRIPTION

The present disclosure encompasses various systems and methods for auto-provisioning AI-based dialog services (e.g. chat bots). The detailed description set forth below in connection with the appended drawings is intended as a description of several currently contemplated embodiments. It is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
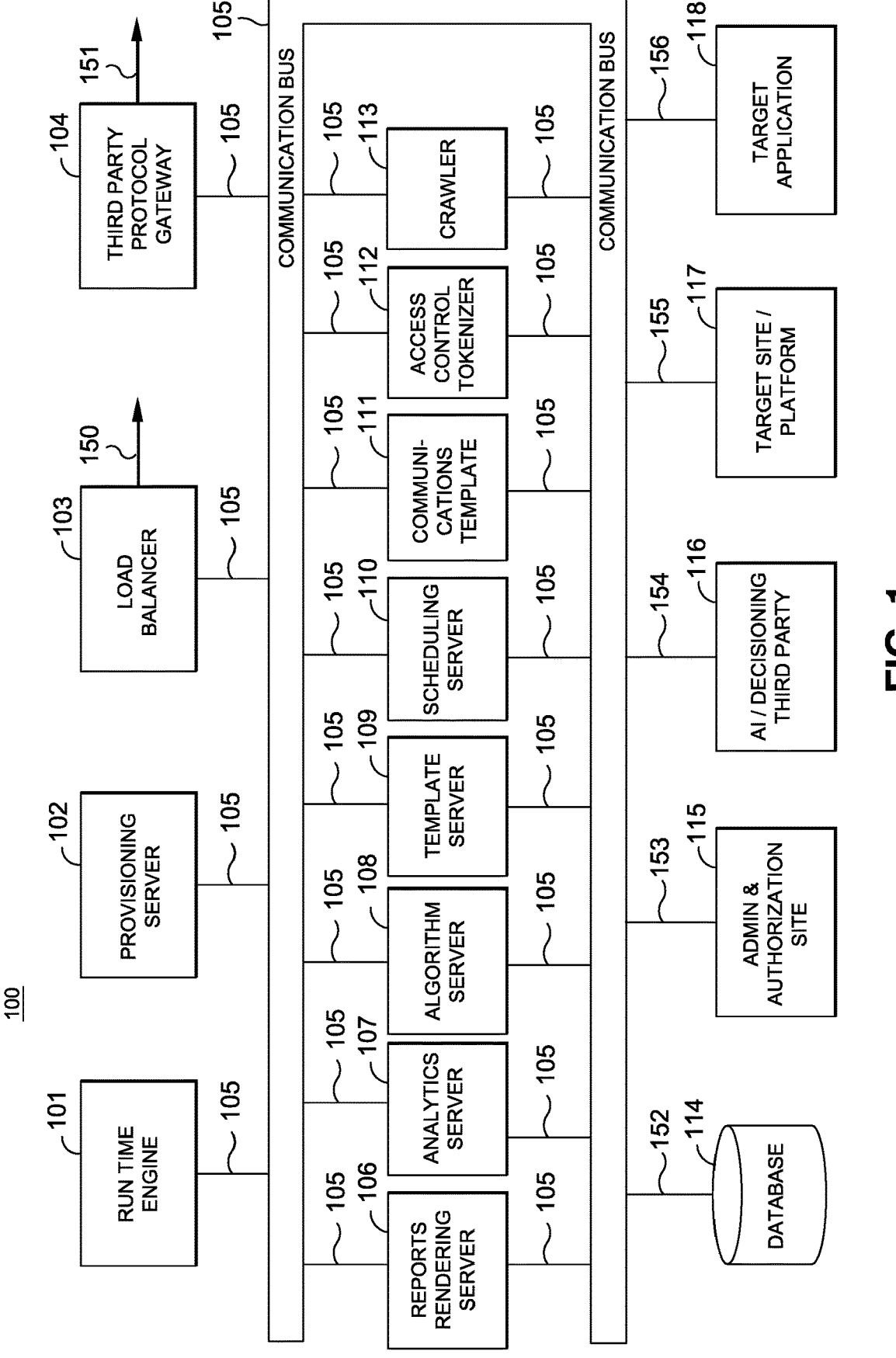
FIG. 1 shows a system for auto-provisioning AI-based dialog services.

FIG. 1 shows an example system for auto-provisioning AI-based (artificial intelligence based) dialogs 100. The figure is divided into three logical sections: The four elements at the top of the diagram represent the "Provider/Coordinator" services part of the system. The eight boxes in the middle of the diagram represent the "Microservices" part of the system. The elements at the bottom represent the "Third Party Resources" part of the system. In a preferred embodiment, all elements depicted in the diagram with the exception of the "Third Party Resources" would communicate with each other over a communication bus 105 as described here. At the discretion of the practitioner of the system 100, some or many of these elements may be "collapsed" into a process or server of a more singular or monolithic nature. In no way does the articulation here of separate processes or servers or applications obviate the possibility of competently deploying the system by combining some of its elements.

The run time engine 101 is characterized as a "Provider/Coordinator" service. A developer of computer software and networks will be familiar with the concept of an application controller or run time engine. Examples of run time software used to control other software includes, but is not limited to, the Java Virtual Machine, the Common Language Runtime component of the .NET framework by Microsoft, or the Adobe AIR runtime engine. Runtime software modules convert programming instructions into machine language on a computer so the instructions may be executed on the computer and other computers connected to it via a network. Tasks performed by the run time engine 101 of the system 100 may include, for example and without limitation, a) the operation of the overall software state machine and execution of various programs; b) performing workflow management; c) logic flow decisioning (primary decisioning for the system 100); and overall coordination of various software represented in the remainder of FIG. 1.

In a preferred embodiment, a run time engine 101 will be employed to act as the orchestrator of various services and microservices depicted in the remainder of the figure. Most of these services and microservices communicate with one another over a communication bus, as depicted in FIG. 1 as communication bus 105. There are many commercially available and open source communication buses that can be utilized. For example, the TIBCO Enterprise Message Service (using JMS/Java Message Service), the RabbitMQ open source message broker, or the Apache Kafka open source distributed streaming platform may be used. The communication bus 105 may act as a communications highway for internal computing platforms in the same network. Communications with third party or cloud-based platforms used by the system 100 may use "external" communications methods such as, but not limited to, REST/HTTP, Webhooks, Web Services, or even proprietary or private network-based communication channels. See U.S. Pat. No. 8,949,377 to Makar et al., entitled "Management System for a Conversational System," the entire disclosure of which is hereby wholly incorporated by reference. External communications methods are further described below in relation to the detailed description of FIG. 1.

The run time engine 101 can be programmed to perform and coordinate overall "bot" or automation functions in concert with other elements of the system 100. The use of a third party protocol gateway 104 as described below in relation to FIG. 1 may also allow the run time engine 101 to augment the utility of third-party bots, either by replacing their function altogether, or to communicate with them to add additional value as described throughout this disclosure. In addition, the run time engine 101 can act as a coordinator of bot services supplied by an AI/decisioning third party 116 as described in further detail below in relation to FIG. 1.

In addition to the run time engine 101, the provisioning server 102 is also characterized as a "Provider/Coordinator" service. The purpose of the provisioning server 102 may be to: a) get credentials and access tokens from third party platforms and applications; b) provide secret API keys; c) get AI/decisioning deploy codes from third party AI platforms; and d) supply token and secret exchange to validate credentialed users of an admin & authorization site 115. The provisioning server 102 may communicate with other (internal network) aspects of the system 100 over the communication bus 105. In a preferred embodiment, the provisioning server 102 will also communicate with "Third Party Resources" such as a database 114; administration and authorization site 115, AI/decisioning third party 116, target site/platform 117, and/or target application 118. Such communication may happen via external communication channels 152, 153, 154, 155, and 156 respectively. These external communication channels are described in more detail below in relation to FIG. 1. In an alternative embodiment of the system 100, the provisioning server 102 may also communicate with one or more "Third Party Resources" that are not externalized but rather located on the same internal network.

An example of how the provisioning server 102 may be used to get access tokens is illustrated by using methods commonly available to developers of, for example, Facebook-ready applications. An application developer with average skills will be familiar with the idea of access tokens. These access tokens are used when a user connects to Facebook using an application that is authenticated with their user ID and password. In a preferred embodiment, the provisioning server 102 can act as a third-party application that obtains Facebook access tokens for secure access to Facebook APIs (Application Programming Interfaces). These access tokens contain a string of data identifying a Facebook user, Facebook page, or Facebook-ready application. There are various access tokens, for example, user access tokens, app access tokens, page access tokens, and client tokens. The provisioning server 102 can therefore be used to act as a proxy on behalf of the owner of a Facebook account, such as a Facebook Business Page.

As an illustrative example of Facebook credentialization, a practitioner of the system 100 would send a client access request via an API method provided by Facebook to start a login dialog. The user would then authenticate and approve permissions for the provisioning server 102 to gain access to the platform. Finally, Facebook would then programmatically return the access token to the client application (the client application being the system 100). Specifically, it is the provisioning server 102 that acts as the client application. In a preferred embodiment, the user would grant access to the system 100 by accessing the admin & authorization site 153 of the system 100 to enter his or her Facebook credentials. These credentials would then be passed by the admin & authorization site 153 to the provisioning server 102 where the tokens and credentials can be used on behalf of the user. A practitioner will grasp easily how the system 100 could be used to gain access to Facebook Business Pages, once authenticated, in order to run programs for the purposes of timeline crawling and dialog automation as described below with reference to FIG. 1.

A practitioner with average skill in computer programs and provisioning will find a variety of access methods and tools that are commercially available to achieve the credentialization of applications connected to the system 100. For example, apparatus and methods for initiating communications with software-based platforms are described in U.S. Pat. No. 9,756,486 to Best et al., entitled "Method, system and apparatus for initiating and processing communications in an instant messaging application," the entire disclosure of which is hereby wholly incorporated by reference. Commonly available APIs (Application Programming Interfaces) from Facebook, Twitter, and other social platforms make this process understandable and doable with minimum effort. An example of how sign-on and authority may be established programmatically is described in U.S. Pat. No. 9,614,835 to Saboori et al., entitled "Automatic provisioning of a device to access an account," the entire disclosure of which is hereby wholly incorporated by reference.

There is no implied limitation in how the provisioning server 102 may be used to authenticate and trade tokens with third party sites, pages, and applications. The provisioning server 102 may be used in conjunction with other third party social timeline offerings such as Twitter, or even proprietary offerings. The provisioning server 102 may be used to authenticate and trade tokens with Android applications, iOS applications, or proprietary applications or web sites.

In addition to the run time engine 101 and provisioning server 102, the load balancer 103 is also characterized as a "Provider/Coordinator" service. A practitioner with common skill in network computing will be familiar with the discipline of application delivery control or load balancing. The basic function of load balancing is to direct communications streams amongst a plurality of applications and computers on a network so as to spread out the traffic evenly and also to hedge against failure of an individual component of the network. If deployed correctly, the practitioner would set up the load balancing function to re-direct communications from a failed component to a working component in order to establish redundancy in the network.

There are many commercially available application delivery controllers and load balancers on the market. Some of these devices are hardware-based and some are software that can be deployed on virtual computing platforms. For example, Radware Alteon by Radware Ltd., F5 Networks, Inc., NGINX, Inc., Cisco Systems, Inc., Citrix Systems, Inc., and Kemp Technologies, Inc. all offer load balancing products that may function as the load balancer 103 of the system 100. The load balancer 103 may communicate with other in-network elements of the system 100 over the communication bus 105. In addition, the load balancer 103 may also be able to communicate with external services over a communication channel 150. For example, the load balancer 103 may communicate over the communication channel 150 with a DNS service such as DNS Made Easy or Neustar, Inc., for example. DNS services provide the ability to balance internet traffic across multiple geographies. In a preferred embodiment, the practitioner of the system 100 would create multiple, geographically separate instances of the system 100. The use of a DNS service along with multiple load balancer 103 elements in each instance will afford the practitioner with disaster recovery capability and high availability of the system 100. However, it is in no way mandatory that the system 100 be deployed in a redundant manner, and this example is only to illustrate a preferred practice.

Functions of the load balancer 103 and the run time engine 101 may include the use of a container orchestration system such as the open source Kubernetes, or Apache Mesos, or Docker Swarm. This is not to imply any limitation of the disclosed subject matter if a containerized approach to network computing is not contemplated by the particular practitioner.

In addition to the run time engine 101, the provisioning server 102, and the load balancer 103, the third party protocol gateway 104 is also characterized as a "Provider/Coordinator" service. The third party protocol gateway 104 is the means with which external communications may be established between the system 100 and various third party platforms. The third party protocol gateway 104 may communicate with other internal elements of the system 100 via the communication bus 105. In addition, the third party protocol gateway 104 may communicate with third party platforms via the communication channel 151. The third party protocol gateway 104 may communicate over the communication bus 105 with "Third Party Resources" such as the database 114, the administration and authorization site 115, the AI/decisioning third party 116, the target site/platform 117, and/or the target application 118. Such communication will happen via external communication channels 152, 153, 154, 155, and 156 respectively.

The purpose of the third party protocol gateway 104 may be two-fold: First, the third party protocol gateway 104 may contain a plurality of communication applications expressly designed to pass command and control information between the system 100 and specific third party platforms. For example, the third party protocol gateway 104 may contain the protocols, instructions, and credentials for communicating with (but not limited to) one or more third party ACD (Automatic Call Distributor), email delivery platform, SMS/Text gateway, chat platform, web site, or social site. A practitioner with average skill in communication methods for service provider platforms such as Twilio or Nexmo will be familiar with the commands for sending and receiving text messages, voice calls or WebRTC calls, for example. Second, the third party protocol gateway 104 may act as a proxy for coordinating said third party platform communications on behalf of a particular user or subscriber of the system 100. For example, the third party protocol gateway 104 may be used to set up an outbound notification via SMS for the owner of a Facebook Business Page "X" and at the same time an outbound phone call notification for the owner of a Facebook Business Page "Y." See U.S. Pat. No. 9,172,558 to Li, entitled "Method and system for actively publishing message in IM group using chat robot," the entire disclosure of which is hereby wholly incorporated by reference.

The third party protocol gateway 104 may also be used to send text or voice-based messages to a contact center platform or digital engagement platform. Such communications may be processed downstream by a contact center platform or digital engagement platform in order to distribute communications amongst customer service representatives or support representatives, for example. An example of such a system is described in U.S. Pat. No. 8,583,466 to Margulies et al., entitled "System and method for routing workflow items based on workflow templates in a call center," the entire disclosure of which is hereby wholly incorporated by reference.

No limitations in the use of the third party protocol gateway 104 are contemplated. There are various third-party platforms, either standard or proprietary, that could be connected to the system 100, for example, a cable set-top box network, an in-car telemetry system, the PSTN (Public Switched Telephone Network), PBX (Private Branch Exchange), or cellular networks to name a few.

The reports rendering server 106 is characterized as a "Microservices" element of the system 100. The purpose of the reports rendering server 106 may be to: a) render data for reports; b) extract report data from the analytics server 107; c) send rendered report data to the admin & authorization site 115; and d) store reporting data in the database 114. The reports rendering server 106 may communicate with other internal elements of the system 100 via the communication bus 105. In addition, the reports rendering server 106 may communicate with external resources via external communication channels 151, 152, 153, 154, 155, and 156 as described earlier.

A practitioner with common knowledge of analytics and report rendering will be familiar with commercially available software for rendering reports such as Microsoft's Forerunner, amCharts, RAWGraphs, and Chart.js. Any one or more of these may be utilized as part of the function of the reports rendering server 106. The reports rendering server 106 may also use reporting templates defined by the practitioner of the system 100 in the template server 109 described below in relation to FIG. 1.

The reports rendering server 106 may transmit report data to a third-party platform for downstream processing via the third party protocol gateway 104. A practitioner with average skill in contact center infrastructure and digital engagement platforms will be familiar with the fact that such downstream systems have their own native reporting capability. In addition, these same downstream contact center infrastructure and digital engagement platforms can use data sent from the reports rendering server 106 to augment this native reporting capability.

The analytics server 107 is characterized as a "Microservices" element of the system 100. The purpose of the analytics server 107 may be to: a) run software subroutines to add new and relevant data to existing data sets; b) analyze data on customer/interactions with bots, applications, and timelines; c) store analytics in the database 114 based on specific templates defined in the template server 109; and d) provide recommendation data for downstream decisioning performed by the run time engine 101 and/or the AI/decisioning third party 116. The analytics server 107 may communicate with other internal elements of the system 100 via the communication bus 105. In addition, the analytics server 107 may communicate with external resources via external communication channels 151, 152, 153, 154, 155, and 156 as described earlier.

The algorithm server 108 is characterized as a "Microservices" element of the system 100. The algorithm server 108 may communicate with other internal elements of the system 100 via the communication bus 105. In addition, the algorithm server 108 may communicate with external resources via external communication channels 151, 152, 153, 154, 155, and 156 as described earlier.

The algorithm server 108 may be used to run a variety of software instructions that include but are not limited to a frequency algorithm that parses text and extracts relevant, frequent entries. In a preferred embodiment, the text being analyzed is based on dialogs in a social timeline, mobile application, or web site application. Frequency algorithms can also be used to parse text and extract relevant data from email history, chat history, or even transcribed voice recordings. A practitioner with common knowledge in the field of natural language processing and linguistic modeling will be familiar with the application of N-gram frequency profiles. These N-gram frequency profiles are a standard way to categorize documents and to perform various classification tasks. There are many scholarly articles on how to approach N-Gram frequency and characterization analysis, for example, Suen, Ching Y., "N-Gram Statistics for Natural Language Understanding and Text Processing," IEEE Trans. on Pattern Analysis and Machine Intelligence, Vol. PAMI1, No. 2, April 1979, pp. 164-172, the entire disclosure of which is hereby wholly incorporated by reference. A practitioner of the system 100 has many choices in programming tools for N-gram frequency analysis and characterization, for example, MIT's open source N-Gram Extraction Tools, the Online Ngram Analyzer, and SunPinyin's open-gram to name a few.

The algorithm server 108 may also assemble relevant text into appropriate answers including the sentiment or tone of the speaker, and the length of responses and dialog. This assembly of relevant text may be based on the N-gram as a unit of analysis, determined by the number of phonemes in a word or phrase.

The algorithm server 108 may be used to perform a series of important tasks, including: a) separating audience responses from administrator or automated responses; b) performing frequency analysis on N-Gram lengths; c) adding N-grams to a corpus or pool of text based on pre-defined frequency criteria; d) performing sentiment analysis to remove audience "noise" from the potential pool; e) extracting noise and or complaints from the main pool for off-line analysis; f) flagging outliers for administrative attention or escalation; g) ranking pools by frequency based on giving a higher rank to elements with greater number of appearances; h) examining bi- and tri-grams for potential sub-topics for answer specificity; i) correlating short-length N-grams with sentence-level N-grams to get statement sets; j) correlating short-length N-grams with sentence-level N-grams; and k) performing extraction and parsing data for downstream assembly and coordination with the template server 109 and AI/decisioning third party 116 elements.

The template server 109 is characterized as a "Microservices" element of the system 100. The template server 109 may communicate with other internal elements of the system 100 via the communication bus 105. In addition, the template server 109 may communicate with external resources via external communication channels 151, 152, 153, 154, 155, and 156 as described earlier.

The template server 109 may be used to create and modify pre-defined templates used for normalizing text data in coordination with the algorithm server 108, the analytics server 107 and the admin & authorization site 108. In a preferred embodiment, the data sets created as answers to the questions posed in the templates would be managed by the analytics server 107 and stored in the database 114. In an alternate embodiment, the template server 109 may also store data sets locally and use the database 114 as a backup or archive of the data sets.

In a preferred embodiment, the template server 109 would be used to create, store, and modify pre-defined templates specific to industry vertical business targets. Templates in the template server 109 (or pre-defined and editable forms) can be used to model text dialog corpus assembly to define the "question and answer treatment" needed for a variety of target application-specific and separate corpora.

For example, if the system 100 were to be deployed for use with a Facebook Business Page servicing a restaurant, the template server 109 could be used to define and re-use templates for "most popular menu item questions" and "most popular menu item answers." Such questions and answers could be "seeded" for use with any restaurant and include tags for relevant N-gram lengths based on a typical restaurant question and answer dialog. For example, the practitioner may associate modal responses as a quadrigram (4-word chunks) with "most popular menu item questions." Likewise, the practitioner may associate modal responses as a pentagram (5-word chunks) with "most popular menu item answers."

There is no limitation in the way in which the template server 109 may be implemented by the practitioner of the system 100. For example, a preferred embodiment may include a default N-gram length, but a practitioner may wish to implement a variable length to tune the system. Randomized or frequency-based responses may be an option provided inside the system, so the practitioner may create template attributes according to his or her preference.

Separate templates may be used to model corpora assembly for stored email threads, SMS threads, chat threads, or transcribed voice recordings.

The overall ability of the system 100 to extract text data, assemble text data, connect (run frequency algorithms and conform to templates), deploy, analyze and update lends itself to by-products that go beyond the automated provisioning of automated dialogs. An example by-product is an automatically generated FAQ. In concert with the crawler 105, the AI/decisioning third party 116, and the scheduling server 110, the template server 109 can be used to normalize FAQ (frequently asked questions and answers) templates so the publishing of auto-generated FAQs can be achieved.

The scheduling server 110 is characterized as a "Microservices" element of the system 100. The scheduling server 110 may communicate with other internal elements of the system 100 via the communication bus 105. In addition, the scheduling server 110 may communicate with external resources via external communication channels 151, 152, 153, 154, 155, and 156 as described earlier.

The scheduling server 110 may be used to send commands to the crawler 113 to periodically re-crawl the target site 117 and/or target application 118 to extract new text. This is done after the initial deployment of the system 100 on a particular target site or application. The target site 117 and/or target application 118 may be a social site timeline, mobile application, web site, transcribed voice recording, email text, SMS text, or chat text. There is no limitation regarding the target application so long as programmatic means exist to extract data from and interact with the target application.

A practitioner with common knowledge in computer programming will be familiar with software utilities that can be used as subroutines to provide timer-based functions. For example, the popular "cron" in Unix-based systems offers time-based job scheduling. The ability to time the execution of commands or shell scripts or otherwise schedule jobs is well-known in the software development community. A cron job can run periodically at specific times, dates, or intervals. For example, programmers use cron to automate administrative tasks such as downloading files from other servers or downloading chat or email dialogs at regular intervals.

In a preferred embodiment, the practitioner of the system 100 may deploy the scheduling server 110 to perform a variety of tasks including: a) re-crawling target applications subsequent to initial deployment in concert with the crawler 113; b) scheduling notifications or escalations in concert with the third party protocol gateway 104; c) scheduling periodic authentication and control token routines in concert with the access control tokenizer 112; d) scheduling the running of periodic analytics routines in concert with the analytics server 107; e) scheduling the distribution or refresh of reports in concert with the reports rendering server 106 and the admin & authorization site 115; and/or f) scheduling the publishing of FAQs in concert with the target site/platform 117 and/or target application 118.

The communications template 111 is characterized as a "Microservices" element of the system 100. The communications template 111 may communicate with other internal elements of the system 100 via the communication bus 105. In addition, the communications template 111 may communicate with external resources via external communication channels 151, 152, 153, 154, 155, and 156 as described earlier.

The communications template 111 may be used to define, edit and store specific third-party credentials, addresses, and sign-on protocols that work in concert with the system 100. Such data may be assembled based on standard templates in the communications template 111 for further storage in the database 114. Such templates may be available downstream to the third party protocol gateway 104, admin & authorization site 115, target site/platform 117 and/or target application 118. The communications template 111 may, for example, store the rules for communications syntax, communications structure, handshaking, and end point information to accommodate for the diverse and often proprietary ways in which third parties allow access to their systems via a protocol gateway. A practitioner who wishes to implement the system 100 may find useful teachings in U.S. Pat. No. 8,832,806 to Ozzie et al, entitled "User authentication management," and U.S. Pat. No. 9,331,909 to Herrera Van Der Nood et al., entitled "System and method for handling a configuration request," the entire disclosures of both of which are hereby wholly incorporated by reference.

The access control tokenizer 112 is characterized as a "Microservices" element of the system 100. The access control tokenizer 112 may communicate with other internal elements of the system 100 via the communication bus 105. In addition, the access control tokenizer 112 may communicate with external resources via external communication channels 151, 152, 153, 154, 155, and 156 as described earlier.

One purpose of the access control tokenizer 112 may be to retrieve deployment codes from the AI/decisioning third party 116 in order to automatically deploy a bot and/or crawler 113 function on the target site/platform 117 and/or target application 118. Another purpose of the access control tokenizer 112 may be to retrieve authorization tokens and/or keys from the target platform or application. The practitioner of the system 100 may program the access control tokenizer 112 to store these deployment codes, authorization tokens and/or keys in the database 115 for downstream retrieval by the run time engine 101, provisioning server 102, and third party protocol gateway 104.

In a preferred embodiment, the access control tokenizer 112 is central to the automatic deployment and provisioning of timeline dialogs. This is because the automation of tokens and deployment codes is a tedious process to perform in a manual way or way that necessitates human intervention. The practitioner of the system 100 will note that the access control tokenizer 112 may be used in concert with the scheduling server 110 in order to periodically re-authenticate tokens for target applications so periodic re-authentication can be automated.

FIG. 1 further depicts the crawler 113, which is characterized as a "Microservices" element of the system 100. The crawler 113 may communicate with other internal elements of the system 100 via the communication bus 105. In addition, the crawler 113 may communicate with external resources via external communication channels 151, 152, 153, 154, 155, and 156 as described earlier.

The use of crawling technology will be understood by the average practitioner of software and text document disciplines. Crawling is the basis for search engines on the worldwide web and also for internal document management in an enterprise. A crawler is essentially an automated program that programmatically scans text data on the web and other platforms to create a tabulated index of data. There are literally hundreds of crawling platforms available to the practitioner, many of which are open source, for example, Nutch, Heritrix, Hounder, WebEater, and LARM to name a few.

Of particular utility for the deployment of the system 100, the crawler 113 may be used to scan text on the target site/platform 117 and/or the target application 118. In addition, the crawler 113 may be used by the practitioner of the system 100 to scan and tabulate text from email platforms, chat platforms, SMS platforms, or even transcribed voice recordings. No limitation in what text is "crawled" is implied.

In a preferred embodiment of the system 100, the resulting text collected by the crawler 113 may be stored in the database 114 for downstream use by other elements of the system 100. For example, a downstream use of crawled data may be the application of AI or decisioning subroutines performed by the algorithm server 108 and the AI/decisioning third party 116. The practitioner will find utility in reviewing teachings from U.S. Pat. No. 9,189,749 to Estes, entitled "Knowledge discovery agent system," and U.S. Pat. No. 7,814,048 to Zhou et al., entitled "Knowledge extraction from online discussion forums," the entire disclosures of both of which are hereby wholly incorporated by reference.

FIG. 1 further depicts the database 114, which is characterized as a "Third Party Resource" element of the system 100. The database 114 may communicate with other elements of the system 100 via the communication bus 105 over communication channel 152. In addition, the database 114 may communicate with external resources, such as the admin & authorization site 115, the reports rendering server 106, the template server 109, and the third party protocol gateway 104, over communication channels 153 and 105. A practitioner may implement the system 100 in such a way that individual non-database elements of the platform access the database 114 by proxy via another process or element as part of the overall system 100. A direct communication path to the database 114 should not be construed as a limitation of the disclosed subject matter.

The purpose of the database 114 may be to store and provide access to corpora, configuration data, token data, communication protocol data, scheduling data, decisioning and workflow data, templates, and target site and target application data. In a preferred embodiment, the practitioner will utilize cloud-based databases such as Amazon S3 or Google Cloud Storage. This may be further extended to include database cache, configuration and customer data using MongoDB Atlas, Google Big Data/Google Big Query. All of these database methods and associated platforms are commercially available. Alternatively, the database 114 can be implemented as part of the internal network of the platform, and not hosted by a third party. For example, the practitioner may contemplate the use of Oracle Database 18c or Microsoft SQL Server to name a few. These, too, are commercially available platforms.

FIG. 1 further depicts the admin & authorization site 115, which is characterized as a "Third Party Resource" element of the system 100. The admin & authorization site 115 may communicate with other elements of the system 100 via the communication us 105 over communication channel 153. The purpose of the admin & authorization site 115 may be to provide administrators and other users of the system 100 with access to the platform from a common UI (user interface) for the purpose of defining templates, entering application target data, stipulating schedules, running reports, defining permissions for users and target sites and applications, and making changes to third party platform access permissions and configuration.

A practitioner with average skill in web site and web page design will be familiar with commercially available and open source programs and tools for building secure web pages that provide UI access to forms and sign-in functions. For example, tools for the purpose of constructing web site forms can be obtained from 123Form Builder and Zoho Forms. Open source alternatives include Crudin, Xataface, VFront, and Tellform to name a few.

In a preferred embodiment, the practitioner of the system 100 will set up authorities that hide or display certain forms and functions depending on the credentials of the person accessing the admin & authorization site 115. Tools for credential management are also commonly available, for example, HashiCorp's Vault, Passbolt, and CyberArk to name a few.

Once authorities are established, the admin & authorization site 115 can be divided into functional sections. For example: a) a section for administrative log-in to make changes at the target application or target enterprise level; b) a section for defining templates affecting text extraction and assembly; c) a section for defining and updating third party communication tokens and protocols; d) a section for defining and running reports; e) a section for defining notifications and escalations to third-party digital engagement or contact center platforms; f) access to schedules and various timed tasks; g) a section for defining workflows and decision logic governed by the run time engine 101 or AI/decisioning third party 116; and/or access to algorithms hosted by the algorithm server 108 for editing and updating algorithms.

In an alternative embodiment, separate user-specific applications can be created for non-web use and access depending on the role of the user. In no way is a preferred method of using a web-based administration UI meant to be a limitation of the disclosed subject matter.

FIG. 1 further depicts the AI/decisioning third party 116, which is characterized as a "Third Party Resource" element of the system 100. The AI/decisioning third party 116 may communicate with other elements of the system 100 via the communication bus 105 over communication channel 154. The purpose of the AI/decisioning third party 116 may be twofold: first, to consume a particular corpus of text and make that text "searchable" programmatically; and second, to create conversation agents (aka "bots") that can be accessed via an API (Application Programming Interface) for programmatically creating a dialogue.

A practitioner familiar with NLP (Natural Language Processing) and Machine Language Learning will be familiar with open source tools for creating both a discovery- and conversation-based program. In a preferred embodiment, a commercially available service is easily attainable for this purpose. For example, the use of IBM's Watson Discovery Service and Watson Assistant Service is described here.

It is important to contemplate the limitations of NLP, AI and other learning systems. These systems do not automatically provision themselves for use on a target social site, web site, or other application. They do not automatically crawl, adhere automatically to pre-defined templates, or self-publish. They are highly customizable and require significant labor and planning in order to integrate them into other platforms for deployment. For these reasons, the AI/decisioning third party 116 is contemplated as a third party sub-system of the disclosed inventive subject matter and does not embody the spirit of the invention itself—that spirit being the complete automation of the provisioning of AI-based dialog services.

Nonetheless, it is instructive for the prospective practitioner of the system 100 to be familiar with the basic capabilities of the Watson Discovery Service and Watson Assistant Service in contemplating alternatives for the AI/decisioning third party 116. If the practitioner chooses to use a preferred embodiment of the system 100, he or she will implement the Watson Discovery Service (WDS) for its ability to analyze a given corpus as input. Once the corpus is input, WDS analyzes that corpus through a proprietary algorithm that allows the corpus to be searchable via multiple other associated services. A practitioner could connect WDS to a simple search engine or connect WDS to a related IBM service enabling the corpus to be accessible by a chat bot like the Watson Assistant Service (WAS). The Watson Assistant Service is a front-end tool for creating conversation agents (chat bots). WAS can be accessed through an API for programmatically creating dialogue or it can be accessed through a GUI. The core logic structure of WAS has two core concepts: intents and entities.

Intents are conversational stems ("how are you," "how's it going," "what's up," "how's it hanging") that convey similar meanings. A creator inputs these intents into Assistant. WAS can then extrapolate other variations/versions of these statements so that an end user can speak in natural language and the creator does not have to have articulated all possible instances of the phrase in question. For example, if the practitioner intends to generate a chat bot for end users to talk with regarding restaurant questions, he or she might create an intent that has to do with operating hours. This operating hours intent might have a few stems like "when are you," "what time do you," "what are your weekend". Notice that "open, close, hours" are not listed here since those would be entities as specified below.

Entities are conceptual units (an entity for colors might contain red, orange, yellow, green, blue, indigo, and violet, while one for fruits might contain apples, pears, oranges, bananas, kiwis, strawberries, and raspberries). Entities are not extrapolatable. In other words, Assistant does not learn from entities like it does from intents. The entities exist to shape the dialogue that is created in WAS and to be able to specify behaviors based on particular inputs from a user. For example, in a dialogue flow related to a restaurant using days of the week entered as entities, WAS can detect if a user asks about Saturday operating hours and return information specific to Saturday. The creator would have had to specify an entity for Saturday and then generate dialogue around that.

Once the practitioner establishes the associated intents and entities, WAS creates dialog functions as a series of nodes. Each node is order-specific, so the system will proceed through the dialogue tree based on node order. Child nodes sit underneath their parent node. When the dialogue enters a parent/child tree, only the nodes in that tree are evaluated unless an outside-the-tree intent/entity is detected. The point of the parent/child structure is to speed response time from the system and help with contextual awareness.

The practitioner may contemplate commercial alternatives to WAS. Such alternatives may include Google Assistant, Google DialogFlow and Amazon Lex, for example.

FIG. 1 further depicts the target site/platform 117, which is characterized as a "Third Party Resource" element of the system 100. The target site/platform 117 may communicate with other elements of the system 100 via the communication bus 105 over communication channel 155. The target site/platform 117 may act as a terminal device and delivery platform for the aforementioned bots or FAQs that are to be automated by the system 100.

As an example, the target site/platform 117 may be a Facebook Business Page managed by a restaurant. The practitioner will be familiar with the aforementioned APIs and tokens provided by Facebook covered earlier in the detailed description of FIG. 1. In this particular example, the system 100 may act as a robotic proxy as if it were a live person typing in answers to questions posed by a visitor to a particular Facebook Business Page. This proxy-ing may be allowed and enabled so long as the invention is credentialed against the Facebook token routines mentioned earlier.

There is no limit to the number or variety of target sites/platforms 117 the system 100 could be coupled with. For example, the system 100 could be used to perform similar operations on a Twitter feed. In another example, the system 100 could be used to perform likewise on a custom web site. Irrespective of the target site/platform 117, the use of automated credentialing, token-trading, and programmatic APIs may be necessary.

Finally, FIG. 1 depicts the target application 118, which is characterized as a "Third Party Resource" element of the system 100. The target application 118 may communicate with other elements of the system 100 via the communication bus 105 over communication channel 156. The target application 118 may act as a terminal device and delivery platform for the aforementioned bots or FAQs that are to be automated by the system 100.

The target application 118 may be any application, either a combination of hardware and software, or strictly software. For example, similar bot and FAQ routines and automated provisioning steps may operate with a smartphone application, an in-car telemetry device, a walk-up kiosk, or a hand-held computer. In a preferred embodiment, such target applications 118 would provide a standard means to programmatically enable credentialization and real time access to timelines or other dialog constructs.

In the above examples, access to target sites/platforms 117 and/or target applications 118 is described as making use of published APIs. However, the disclosed subject matter is not intended to be so limited. For example, it is also contemplated that the automated provisioning and related value-added capabilities described above could be achieved by hard-coding to platforms that do not have published APIs, but rather proprietary access methods.

Figures 2, 2A:
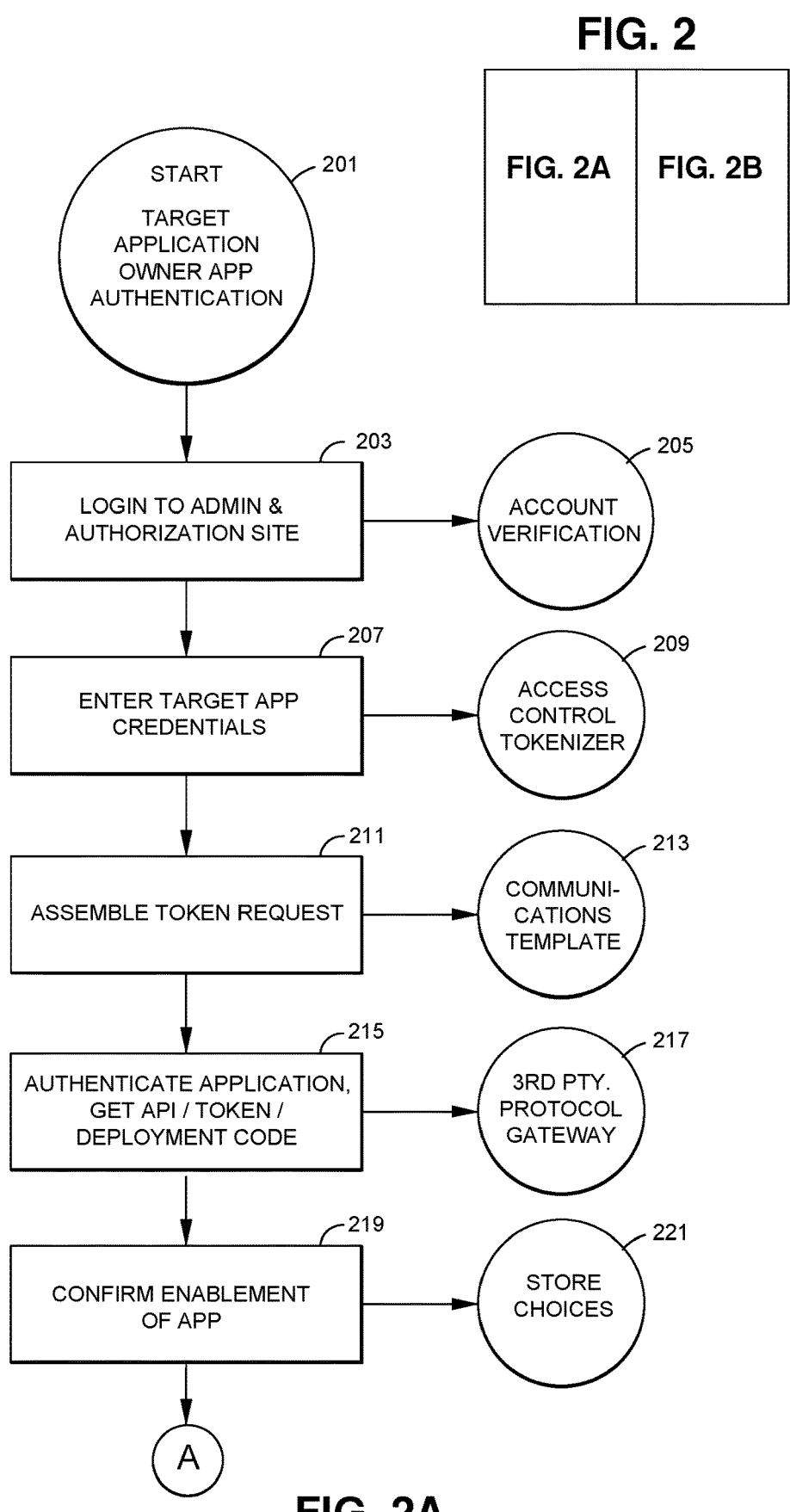
Figure 2B:
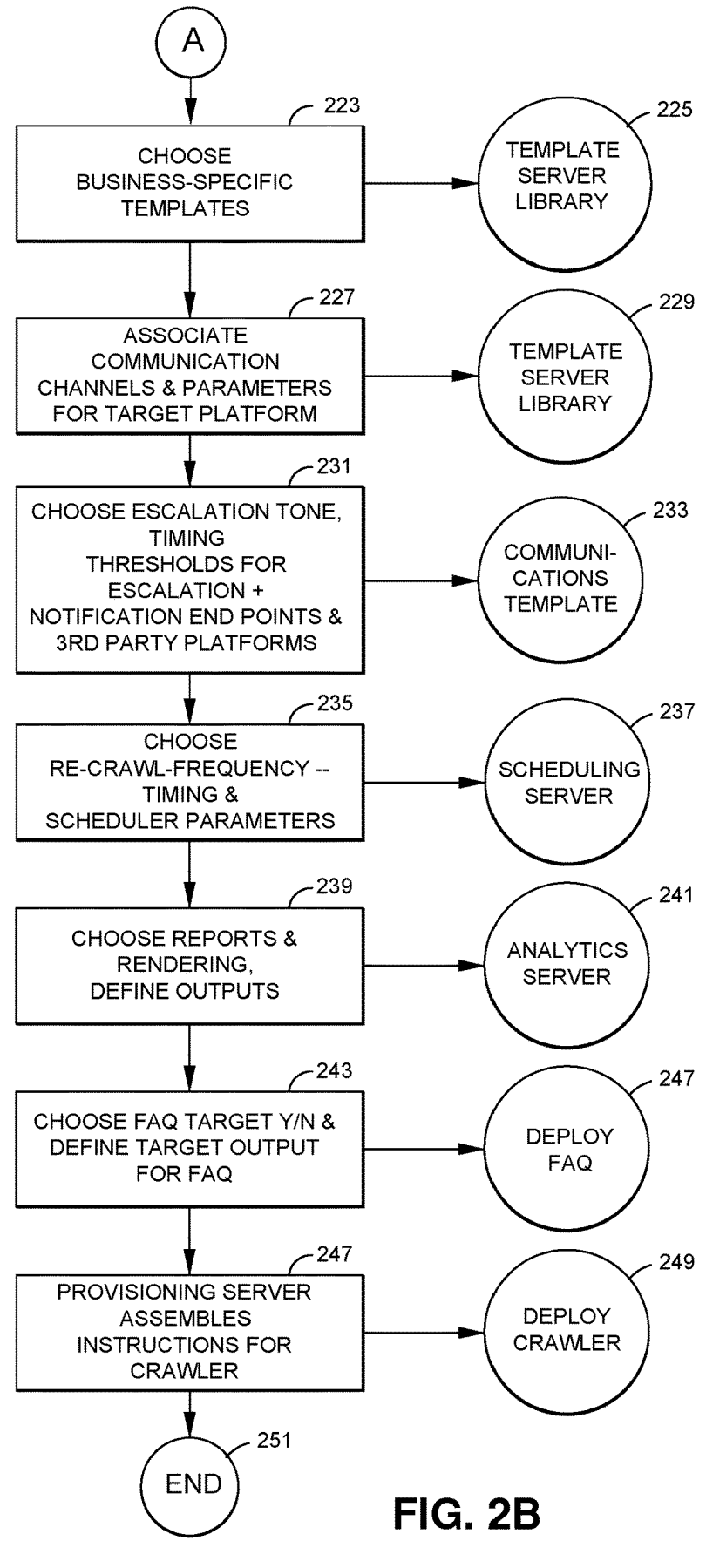

FIG. 2 diagrammatically depicts the arrangement of FIGS. 2A and 2B, of which FIG. 2A shows a first part of a process or logic flow for credentialization and provisioning and FIG. 2B shows a second part of the process. Starting at step 201, the "owner" of the target site/platform 117 and/or target application 118 (e.g. Facebook Business Page, Twitter account, Web site, etc.), generally referred to hereinafter as target application 117, 118, will have in his or her possession the credentials needed to log in as an owner or administrator to the chosen target application 117, 118. In the context of the system for auto-provisioning AI-based dialog services 100 shown in FIG. 1, an "owner" of a target application 117, 118 may also be regarded as a "user" or "subscriber" of the system 100. The practitioner of the system 100 will have supplied the owner of the target application 117, 118 with the location and credentials for logging in to the admin & authorization site 115 as described in relation to FIG. 1. At step 203, the owner of the target application 117, 118 logs in to the admin & authorization site 115, establishing account verification at step 205.

Once the owner of the target application 117, 118 is logged in and verified at the admin & authorization site 115, he or she navigates to a menu item for entering target application credentials at step 207. These credentials are directed by the system 100 to the access control tokenizer 112, described earlier in relation to FIG. 1, at step 209. The access control tokenizer 112 assembles a token request at step 211 and uses a communications template 111 as described in relation to FIG. 1 to package the information for delivering to the target application 117, 118 at step 213.

The system 100 is now ready, at step 215, for the authentication process to continue by sending the token request or other control information to the target application 117, 118 (e.g. as an API request). Such request may be sent via the third party protocol gateway 104 at step 217. Depending on the authentication steps offered by the target application 117, 118, certain choices may now be made available to the owner of the target application 117, 118 at step 219. For example, the owner may be given the opportunity to confirm that the system 100 will be connected to the target application 117, 118, to grant the system 100 authorization to read and write into a timeline, and/or to grant the system 100 authorization to access contact records of followers and other third-party users of the target application 117, 118. These choices may be relayed to the owner of the target application 117, 118 on the admin & authorization site 115 via an IFrame or API commands depending on the rules set up by the target application 117, 118. The owner's credentialization choices are stored at step 221. At this point, the Access Control Tokenizer will swap the requisite data with the target application 117, 118 and then store the resulting token or other credentials in the database 114 as described in relation to FIG. 1. This part of the logic flow may repeat itself periodically as tokens often expire periodically.

At step 223, the owner of the target application 117, 118 is asked to choose from a list of templates (e.g. a business-specific list of templates) managed by the template server 109 as described in relation to FIG. 1. For example, the owner of the target application 117, 118 may choose a template pre-defined for restaurants, or one for a hardware store or grocery store. The practitioner of the system 100 may present these templates, which may be accessed from a library of the template server 109 in step 225, as forms that allow the owner of the target application 117, 118 to choose sets of common questions, answers, business hours and other information that can be used downstream by the system 100. The resulting choices may be archived in the database 114 in association with the target application 117, 118 and/or owner thereof for later retrieval by other elements of the system 100.

At step 227, the owner of the target application 117, 118 is asked to choose communication channel(s) and parameters for the target application 117, 118. This may be achieved via the use of a list of templates managed by the template server 109 as described in relation to FIG. 1 and accessed in a step 229. For example, the owner of the target application 117, 118 may choose a template pre-defined for defaulting to target application timeline messages or direct messages. These forms allow the owner of the target application 117, 118 to set the default communication parameters available in each target application 117, 118 as per the abilities and APIs of the chosen target application 117, 118. The resulting choices may be archived in the database 114 in association with the target application 117, 118 and/or owner thereof for later retrieval by other elements of the system 100.

At step 231, the owner of the target application 117, 118 is asked to choose the attributes for escalation and notification triggers for the target application 117, 118. As in the case of steps 223 and 227, this may be achieved via the use of a list of templates managed by the template server 109 as described in relation to FIG. 1. For example, the owner of the target application 117, 118 may choose: a) the tone of the end user or speaker to ascertain a trigger for escalation or notification; b) the length of time the bot has been engaged with the end user or speaker; and/or c) the business classification or "cluster" according to the dialog with the end user or speaker. There is no limitation to the number and breadth of attributes that can be used as triggers for notification or escalation.

Also, at step 231, the owner of the target application 117, 118 may specify the address or type of 3rd party platform such notifications or escalations should be pointed to in accordance with communications templates 111 accessed in step 233. Examples may include an SMS-based alert defined in the third party protocol gateway 104 or the address for a third party ACD (Automatic Call Distributor) defined in the third party protocol gateway 104. Other possible addresses for reference in the third party protocol gateway may include a chat system, an email system, or even an in-car telemetry system or PSTN or cell phone number. The resulting choices may be archived in the database 114 in association with the target application 117, 118 and/or owner thereof for later retrieval by other elements of the system 100.

At step 235, the owner of the target application 117, 118 is asked to choose the re-crawl frequency including attributes for general timing and scheduling of tasks. This may be achieved via the use of the scheduling server 110 shown in FIG. 1 in step 237. At step 239, the owner of the target application 117, 118 is asked to choose the types of reports and analytics that will be used for gaining insights about the performance of the application. Here, the owner of the target application 117, 118 will stipulate the rendering of the reports and how reports should be saved (i.e. to the screen, downloaded as a CSV file, uploaded to an FTP server, etc.). This may be achieved by accessing the analytics server 107 in a step 241 to obtain available options, as well as via the use of the scheduling server 110 to specify timing of reports. The resulting choices may be archived in the database 114 in association with the target application 117, 118 and/or owner thereof for use by other elements of the system 100.

At step 243, an option of outputting an FAQ (Frequently Asked Questions and Answers) may be presented to the owner of the target application 117, 118. The owner of the target application 117, 118 may define a URL, JSON object, HTML file or some other means to publish an FAQ that will be automatically generated by the system 100 after the target application 117, 118 has been crawled, the FAQ being an AI-based set of answers to common questions as classified by the system 100. At step 245, the optional FAQ may be deployed on a preferred platform by the owner of the target application 117, 118. The resulting choices may be archived in the database 114 in association with the target application 117, 118 and/or owner thereof for use by other elements of the system 100.

Finally, at step 247, with the various choices and other user information having been stored in the database 114 in relation to the target application 117, 118, the owner of the target application 117, 118 is asked whether or not to deploy the crawler 113 so it may commence its work on the target application 117, 118. All of the data collected at this point may be accessed by the provisioning server 102 as described in relation to FIG. 1. In concert with the run time engine 101, the provisioning server 102 may deploy the system 100 including the crawler 113 automatically on the target application 117, 118 in a final step 249. By the same token, at step 247, the owner of the target application 117, 118 may turn the system 100 "off" so it no longer provides automated AI-based dialog services.

Step 251 signifies the end of the example credentialization and provisioning logic flow shown in FIGS. 2A and 2B. The practitioner will note, however, that it is not strictly necessary for the entire logic flow to be completed each time the owner of the target application 117, 118 wishes to make a change. What has been represented here is a typical "sunny path" flow of steps for provisioning a target application 117, 118 comprehensively, but it is contemplated that the owner of the target application 117, 118 may enter into the admin & authorization site 115 to make a change in just a single step or two after the initial provisioning has been completed.

Figures 3, 3A:
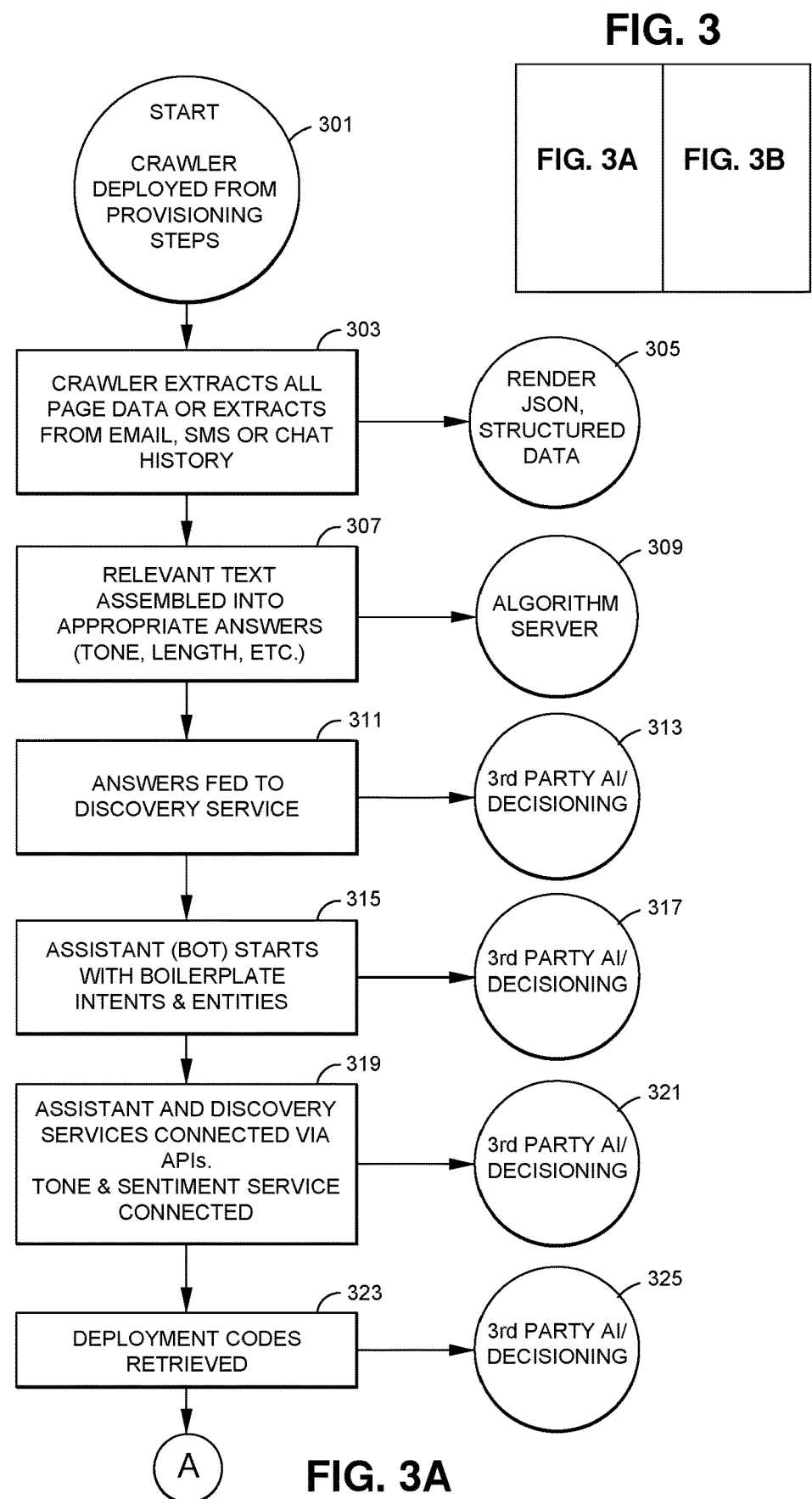
Figure 3B:
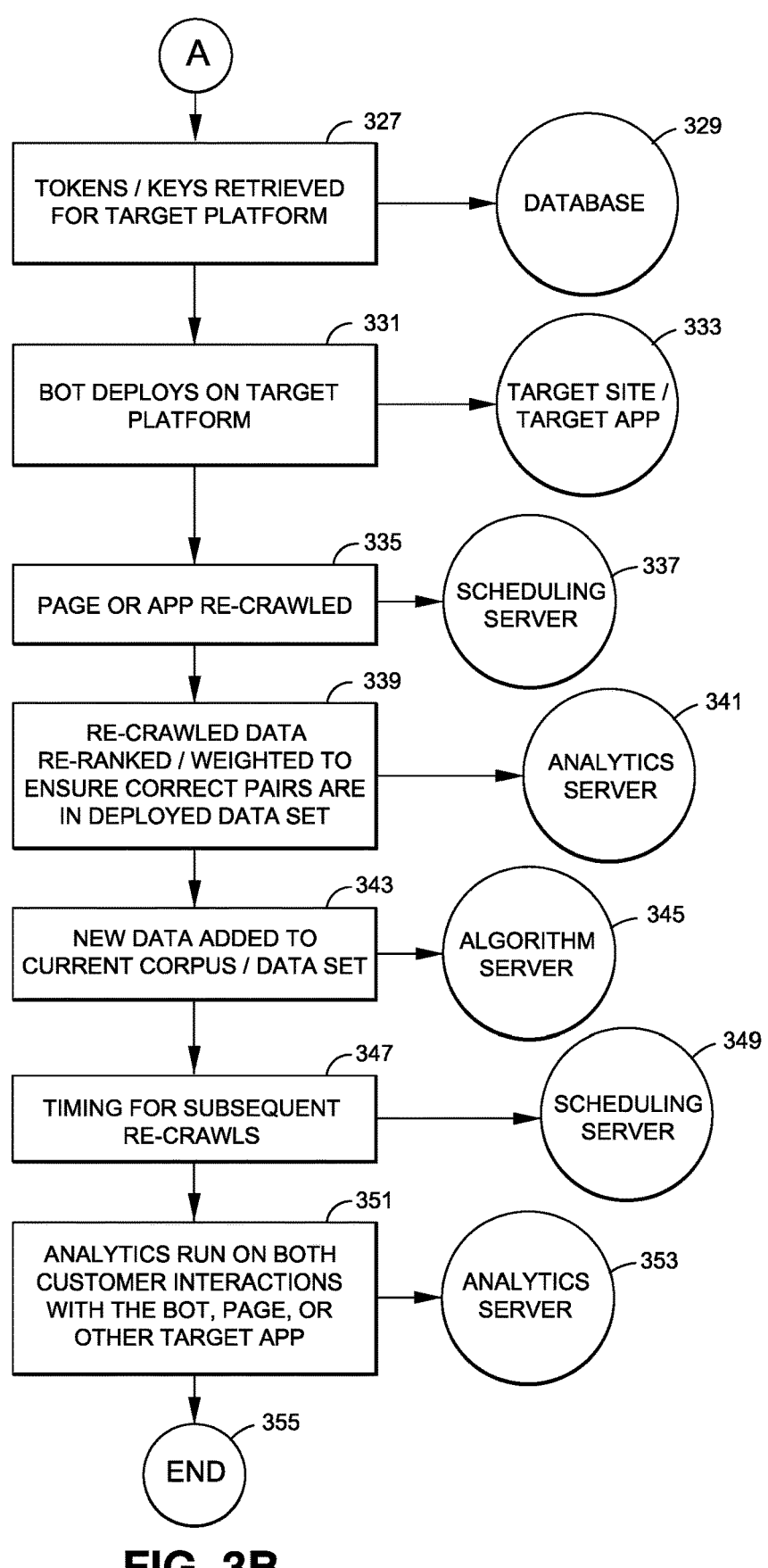
FIG. 3B shows a second part of the process.

FIG. 3 diagrammatically depicts the arrangement of FIGS. 3A and 3B, of which FIG. 3A shows a first part of a process or logic flow for auto-crawling, bot deployment, scheduling, and training and FIG. 3B shows a second part of the process. At step 301, the process begins where FIGS. 2A and 2B leave off. That is to say, the crawler 113 function has already been deployed owing to the steps taken by the owner of the target application 117, 118 as described in relation to FIGS. 2A and 2B.

At step 303, the crawler 113 extracts page data or other textual data from the target application 117, 118, which may include textual data from email systems, chat systems, or SMS systems. At step 305, the algorithm server 108 described in relation to FIG. 1 may render this textual data into JSON (JavaScript Object Notation) or other structured data forms. At step 307, the rendered textual data is assembled into appropriate answers based on tone, length, and other classification attributes. Such assembled answers may be compiled as an AI training corpus by the algorithm server 108 at step 309.

At step 311, the algorithm server 108 feeds the assembled answers to a discovery service (e.g. the Watson Discovery Service) as described in relation to FIG. 1. The discovery service may be represented in FIG. 1 by the AI/decisioning third party 116. In step 313, the AI/decisioning third party 116 thus receives the assembled answers provided by the algorithm server 108. As noted previously, the practitioner of the system 100 may decide to create his or her own proprietary discovery service and may choose not to use a third-party service for this function.

At step 315, an assistant/bot service (e.g. the Watson Assistant Service) as described in relation to FIG. 1 loads boilerplate templates for intents and entities. The assistant/bot service may be represented in FIG. 1 by the AI/decisioning third party 116. At step 317, the AI/decisioning third party 116 process connects the assistant and discovery services together, for example, using available APIs. In an embodiment in which assistant and discovery services are combined in a single service (e.g. provided by the same third party), the assistant and discovery services may already be connected, and communication using an API may not be necessary. At step 319, tone and sentiment service along with other classifiers are pre-loaded into the assistant/bot service. At step 321, the AI/decisioning third party 116 process may use decision logic to synchronize with other logic and workflow governed by the run time engine 101 of the system 100.

At step 323, the access control tokenizer 112 is used to retrieve deployment codes from the AI/decisioning third party 116 platform. At step 325, the AI/decisioning third party 116 platform generates the deployment codes that are sent downstream to the system 100 for provisioning of the AI-based dialog service (e.g. chat bot).

At step 327, the tokens and/or keys supplied by the target application 117, 118 as described in relation to FIGS. 2A and 2B are retrieved, for example, by accessing the database 114 at step 329. Now at step 331, with both the deployment codes from the AI/decisioning third party 116 and the target site and/or application tokens available to the system 100, the AI-based dialog service (e.g. chat bot) may be automatically deployed on the target application 117, 118 at step 333, which may subsequently supply automated answers using the AI-based dialog service.

At step 335, the activity of re-crawling the target application 117, 118 for questions and answers commences. To this end, at step 337, the scheduling server 110 may be queried to verify the frequency of the re-crawling and re-weighting of the text.

At step 339, re-crawled textual data is re-ranked by the algorithm server 108 and AI/decisioning third party 116 platform and further weighted to ensure the correct pairs (e.g. pairs of related questions or key value pairs) are deployed and re-deployed as part of the working data set for the target application 117, 118. At step 341, the analytics server 107 stores this information so it can be assembled and rendered as part of the reports offered by the reports rendering server 106 as described in relation to FIG. 1.

At step 343, the new data resulting from the re-crawling and re-weighting is added to the current dialog corpus/data set. At step 345, this new data is analyzed by the algorithm server 108.

At step 347, timing for subsequent re-crawling and re-weighting activities is stored, for example, by accessing the scheduling server 110 and/or database 114 at step 349. The timing parameters and other triggers specified by the owner of the target application 117, 118 as described in relation to FIG. 2 may be used to repeat the process starting at step 335 of FIG. 3.

At step 351, analytics are performed on "both sides" of the dialog, that is, the customer (third-party user) side of the interactions and the bot/owner side of the dialog. Information about the origin of the dialog, including application, page, etc., may be stored at step 353 by accessing the analytics server 107 and/or the database 114.

At step 355, the example logic flow for auto-crawling, bot deployment, scheduling and training shown in FIGS. 3A and 3B is at an end. However, the practitioner may find more utility in allowing this logic flow to loop upon itself, at least partially, to further the automation of the crawling and training of the dialogs.

Figures 4, 4A:
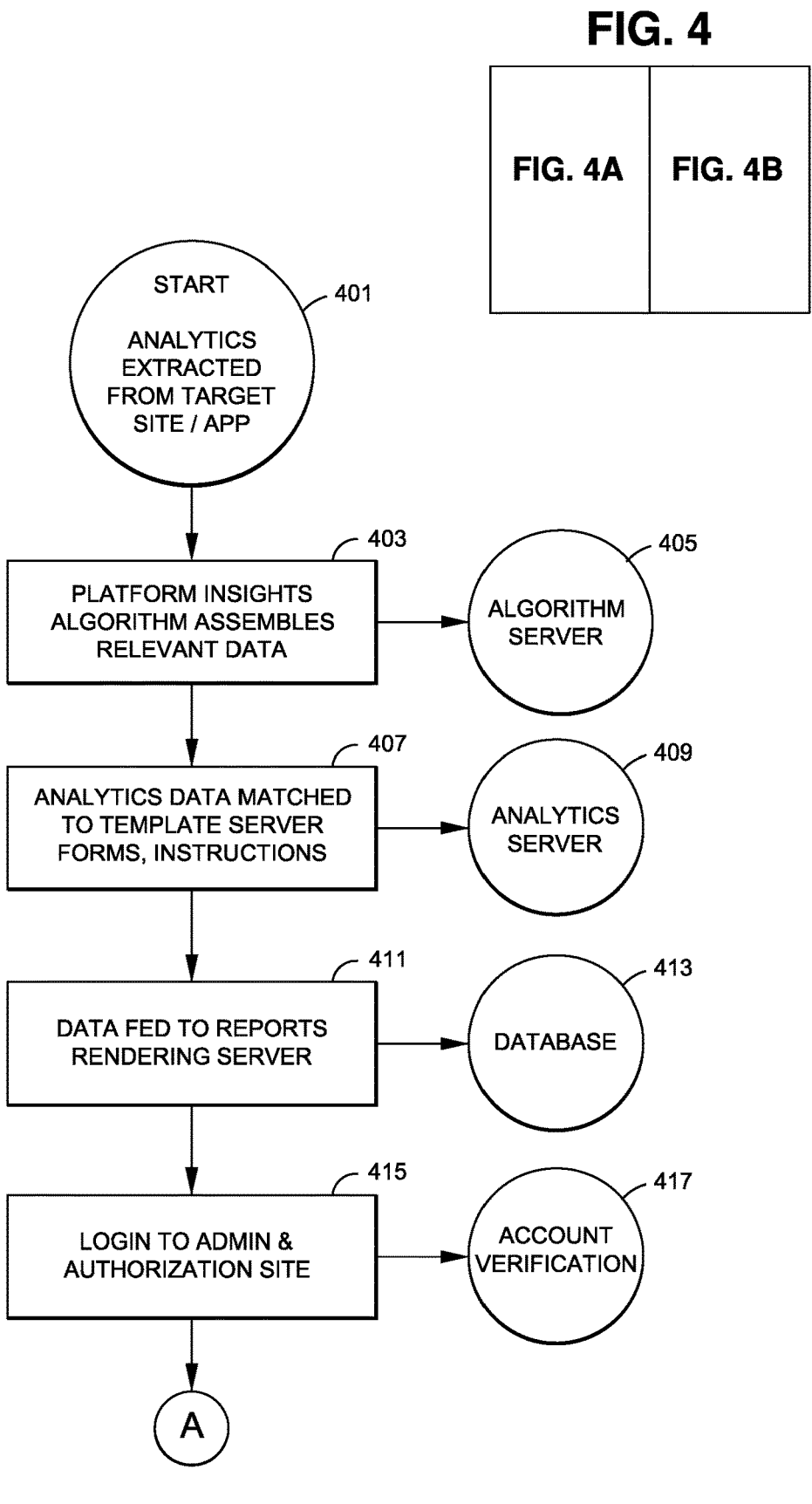
Figure 4B:
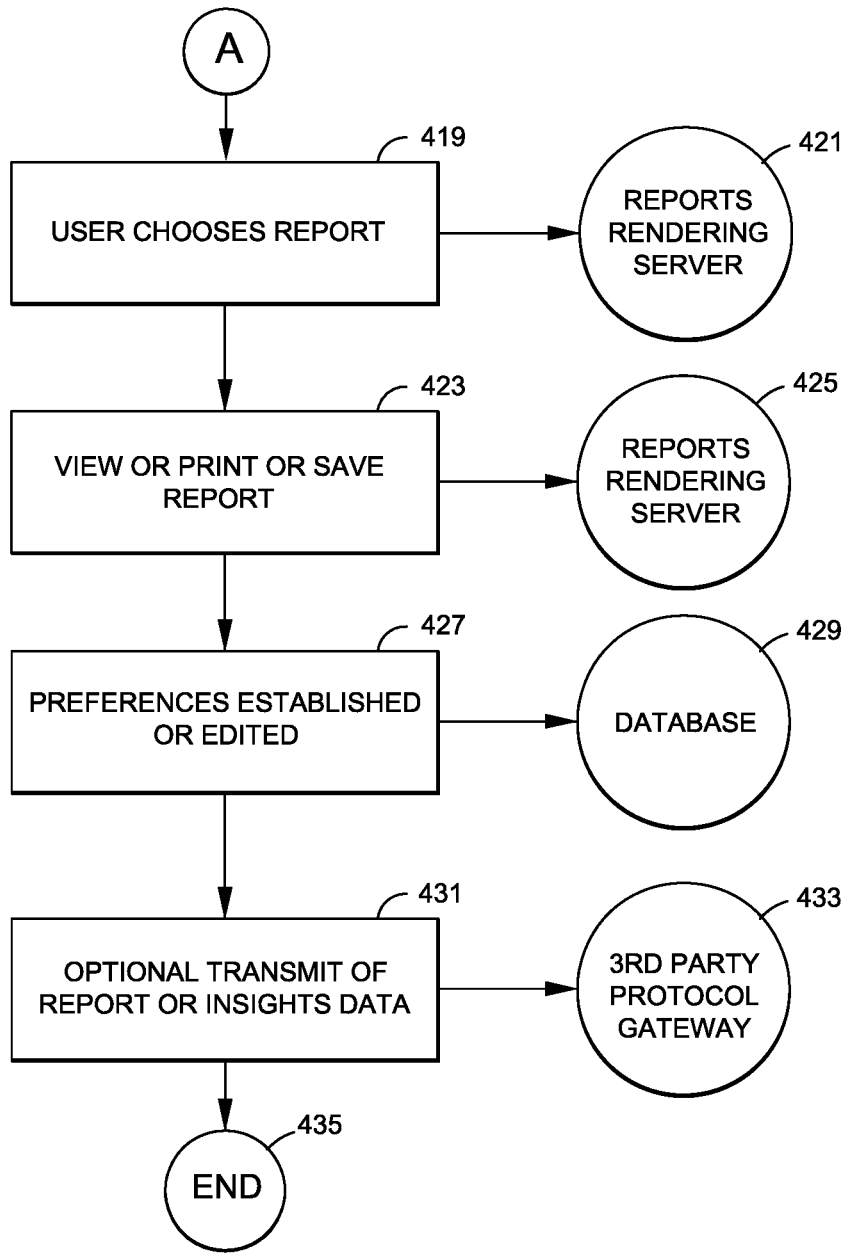

FIG. 4 diagrammatically depicts the arrangement of FIGS. 4A and 4B, of which FIG. 4A shows a first part of a process or logic flow for analytics and reports and FIG. 4B shows a second part of the process. At step 401, the process for analytics and reports commences with data being extracted from the target application 117, 118. At step 402, the system 100 (e.g. a "Platform Insights" algorithm thereof) assembles relevant data under the control of the algorithm server 108. To this end, access to the algorithm server 108 may be made at step 405.

At step 407, extracted data from the target application 117, 118 is assembled and matched to forms managed by the template server 109 and other instructions. At step 409, the analytics server 107 may read and process such data-filled forms and other instructions in anticipation of report rendering. Such forms, instructions, etc. may contain information about user-made choices regarding the content, presentation, and scheduling of reports. At step 411, the resulting data is fed to the reports rendering server 106, and additional relevant information is retrieved from the database 114 at step 413.

In a preferred embodiment, the practitioner of the system 100 will have automated steps 401 through 413, for example, in accordance with user-made choices, defaults, etc. In an alternative embodiment, these steps may proceed after the owner of the target application 117, 118 logs in to the admin & authorization site 115 to run reports, such that the system 100 runs reports "on demand." In either case, accessing of such reports, once run, may proceed as described below in relation to steps 415-435.

At step 415, the owner of the target application 117, 118 logs in to the admin & authorization site 115, establishing the verification of account information at step 417. At step 419, the owner of the target application 117, 118 chooses the type of report he or she wishes to access. At step 421, the reports rendering server 106 may work in coordination with the analytics server 107 and the database 114 to assemble and render the chosen reports.

At step 423, the owner of the target application 117, 118 chooses to view the reports online, or to print the reports, or to save or upload the reports into an off-line BI (Business Information) system managed by a third party outside of the system 100. At step 425, the reports rendering server 106 process delivers the reports as per the selection made by the owner of the target application 117, 118.

At step 427, the owner of the target application 117, 118 may wish to re-establish or otherwise edit the preferred rendering and delivery targets for reports. Such changed or edited information may be saved in the database 114 as a user preference in step 429.

At step 431, a step of transmitting report data to an external platform is contemplated. If such a step is undertaken, the third party protocol gateway 104 may be used at step 433 to transmit report data to a downstream process, not essentially part of the system 100, as per the preferences saved earlier by the owner of the target application 117, 118.

At step 435, the example process for analytics and reports shown in FIGS. 4A and 4B ends. In a preferred embodiment, the owner of the target application 117, 118 would have access to this process at any time so long as he or she is credentialed on the admin & authorization site 115.

Figures 5, 5A:
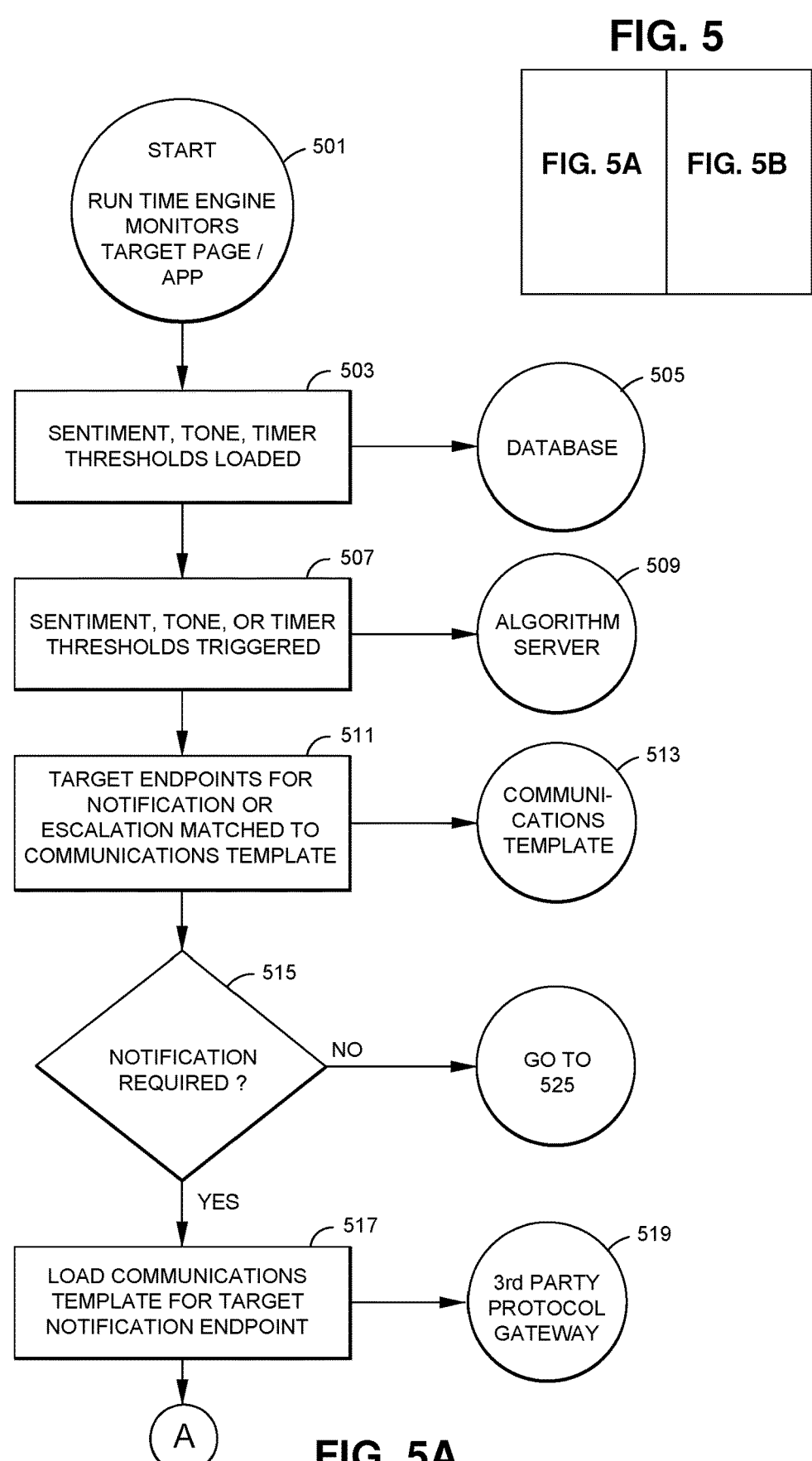
Figure 5B:
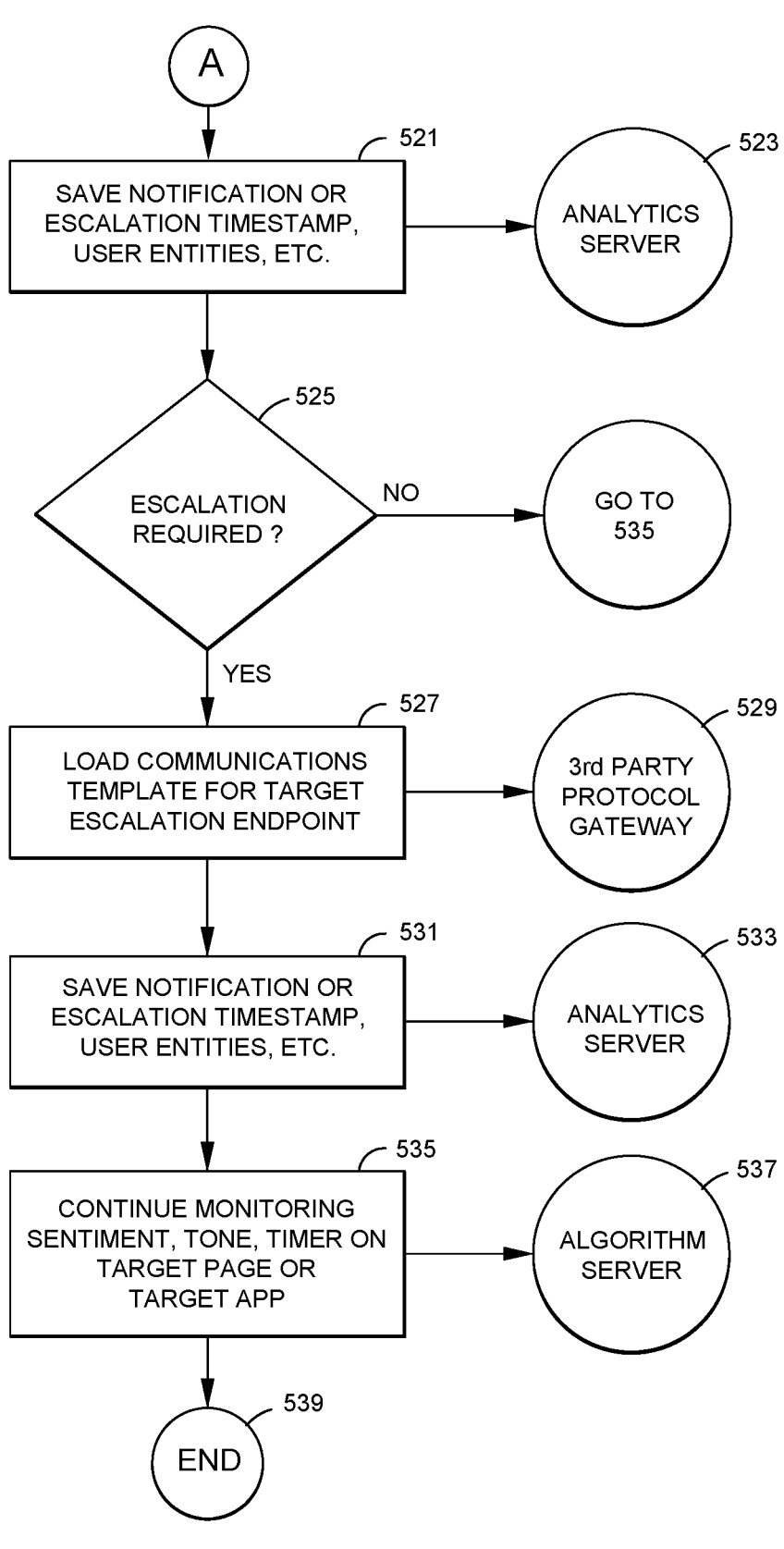

FIG. 5 diagrammatically depicts the arrangement of FIGS. 5A and 5B, of which FIG. 5A shows a first part of a process or logic flow for escalation and notification and FIG. 5B shows a second part of the process. At step 501, the run time engine 101 monitors the target application 117, 118 and directs other elements of the system 100 to continue to extract text, recrawl, re-weight and add to the target application dialog corpus as described in relation to FIG. 4.

As described in relation to FIG. 2, the system 100 will have automated numerous routines to scan text for tone, sentiment, scheduled timers and other attributes in step 503, which may be stored for subsequent retrieval by elements of the system 100 in the database 114 at step 505. At step 507, sentiment, tone, and other attributes are matched in real time under the control of the run time engine 101 and in concert with the scheduling server 110, and the algorithm server 108 will use such matched attributes to ascertain triggering events at step 509. For example, a triggering event may be an "angry" sentiment on the customer side of a dialog. Another triggering event may be a dialog between a user and an AI-based dialog service (e.g. chat bot) that lasts for more than five minutes. There is no limitation to the ways in which the practitioner may allow the system 100 to trigger on a plurality of events based on a plurality of attributes.

At step 511, should any triggering events occur, these events are matched with target third party endpoints for notification or escalation. As described in relation to FIGS. 2A and 2B, the owner of the target application 117, 118 will have specified the address or type of 3rd party platform such notifications or escalations should be pointed to. Examples may include an SMS-based alert or an address of a third party ACD (Automatic Call Distributor), which may be defined in the third party protocol gateway 104 as described in relation to FIG. 1. With the target endpoints having been stored in the third party protocol gateway 104, a communications template 111 may be used to assemble the communication for the notification or escalation at step 513.

At step 515, the system determines if the thresholds and/or triggers for a notification have been met. If the triggers for a notification have been met, the logic flow may continue to step 517. If not, the logic flow proceeds at step 525.

At step 517, once the thresholds and/or triggers for a notification have been met, the system 100 loads the appropriate communications template 111 containing the target notification endpoint and sends this to the third party protocol gateway 104 at step 519. At this point, the communication has been set up and it is the job of the third party protocol gateway 104 to transmit the communication to the target endpoint for processing. At step 521, the timestamp of the communication and addressing information is saved. This same timestamp and addressing information may further be transmitted to the analytics server 107 at step 523 for downstream processing for reports. In a preferred embodiment, the practitioner of the system 100 will implement a "Call Log" type of report so the target application 117, 118, address of target endpoint, phone number, timestamp, etc. can be stored in the database 114 for later retrieval.

At step 525, whether or not the thresholds and/or triggers for a notification have been met, the system may determine if the thresholds and/or triggers for an escalation have been met. If the thresholds and/or triggers for an escalation have been met, the logic flow continues to step 527. If not, the logic flow proceeds at step 535.

At step 527, once the thresholds and/or triggers for an escalation have been met, the system 100 loads the appropriate communications template 111 containing the target escalation endpoint and sends this to the third party protocol gateway 104 at step 529. At this point, the communication has been set up and it is the job of the third party protocol gateway 104 to transmit the communication to the target endpoint for processing. At step 531, the timestamp of the communication and addressing information may be saved. This same timestamp and addressing information may further be transmitted to the analytics server 107 at step 533 for downstream processing for reports. In a preferred embodiment, the practitioner of the system 100 will implement a "Call Log" type of report so the target application 117, 118, address of target endpoint, phone number, timestamp, etc. can be stored in the database 114 for later retrieval.

At step 535, the system 100 continues to monitor text for sentiment, tone, timers, and other attributes of the target application 117, 118 and transmits the same to the algorithm server 108 at step 537.

At step 539, the example process of FIGS. 5A and 5B ends. However, in a preferred embodiment, the process may "loop" back to step 510 and continue.

FIG. 6 shows an example data structure 600 for auto-provisioning AI-based dialog services in accordance with the disclosed subject matter. The data structure 600 may be stored in the database 114 of the system 100 of FIG. 1 and may represent the contents of various storages and archives referred to throughout this disclosure. The data structure 600 may represent one or more deployment objects, each associating one or more dialog templates and/or other information with a target application 117, 118. In the example of FIG. 6, the data structure 600 is illustrated in tabular form to represent associations between various items of data as described in relation to FIGS. 1-5B. In particular, a single row of the data structure 600 may correspond to a single deployment object associated with a target site/platform 117 and/or target application 118. As such, each row of the data structure 600 may represent the data stored for a particular user/subscriber of the system 100. Each such deployment object may have, for example, a deployment object ID 610 identifying the deployment object, a user/subscriber ID identifying the user/subscriber who is the owner of the target application 117, 118, and a specification of target application credentials/tokens 630 associated with the target application 117, 118. Target application credentials for connecting to the target application 117, 118 may, for example, be stored in the data structure 600 in response to the user/subscriber's interaction with the admin & authorization site 115 as described in relation to step 207 of FIG. 2A, while tokens for connecting with the target application 117, 118 may likewise be stored later as described in relation to step 215 of FIG. 2A. Each deployment object may further have dialog template data 640 as may be determined in step 223 of FIG. 2B, FAQ data 650 as may be determined in step 243 of FIG. 2B, communication channel data 660 as may be determined in step 227 of FIG. 2B, notification/escalation data 670 as may be determined in step 231 of FIG. 2B, and scheduling data 680 as may be determined in steps 231, 235, 239, etc., each associated with the particular target application 117, 118 in the data structure 600. Lastly, each deployment object may further associate crawler data/training corpus 690 with the particular target application 117, 118, such crawler data/training corpus 690 including, for example, the raw crawler data and/or the assembled inquiries or inquiry responses output by the algorithm server 108 and/or AI/decisioning third party 116 as may be obtained in steps 303-323 of FIG. 3A. Such a deployment object may initially be generated by the system 100 (e.g. by the template server 109) in response to a user/subscriber's interaction with the admin & authorization site 115 and may be further updated automatically in accordance with the scheduling data 680.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor to perform operations for auto-provisioning AI-based dialog services for a plurality of target applications, the operations comprising:

storing a plurality of dialog templates, each of the dialog templates including one or more sets of common inquiries or common inquiry responses;

generating a deployment object corresponding to a target application from among the plurality of target applications, the target application being for use in a particular industry, the deployment object comprising items of data related to the target application;

associating one or more of the dialog templates with the deployment object;

extracting textual data from the target application;

rendering the extracted textual data into JavaScript Object Notation;

assembling the extracted textual data into inquiries or inquiry responses based on tone and length and according to the one or more dialog templates associated with the deployment object to compile an AI training corpus;

periodically providing updates to the AI training corpus using periodic text, application and page crawling subroutines;

feeding the assembled inquiries or inquiry responses to a discovery service to make the AI training corpus searchable; and deploying an AI-based dialog service to the target application based on the AI training corpus.

2. The non-transitory program storage medium of claim 1, wherein said extracting includes deploying a crawler to the target application.

3. The non-transitory program storage medium of claim 2, wherein the deployment object further associates crawler scheduling information with the target application, and the crawler is deployed according to the crawler scheduling information associated with the deployment object.

4. The non-transitory program storage medium of claim 3, wherein the operations further comprise:

updating the assembled inquiries or inquiry responses based on subsequently extracted textual data from the target application, the subsequently extracted textual data obtained by the crawler according to the crawler scheduling information associated with the deployment object; and updating the AI-based dialog service based on the updated assembled inquiries or inquiry responses.

5. The non-transitory program storage medium of claim 1, wherein said assembling includes assembling the textual data based on one or more attributes selected from the group consisting of: a tone or sentiment of the inquiry or inquiry response, a personality associated with the inquiry or inquiry response, a relevance of the inquiry or inquiry response, a length of the inquiry or inquiry response, a response time of the inquiry or inquiry response, and a target audience of the AI-based dialog service.

6. The non-transitory program storage medium of claim 1, wherein said assembling includes ranking and weighting the assembled textual data to ensure appropriate dialog answers are presented in priority order.

7. The non-transitory program storage medium of claim 1, wherein said assembling includes correlating short-length language n-grams with sentence-level n-grams to assemble relevant statement sets.

8. The non-transitory program storage medium of claim 1, wherein said deploying includes receiving a deployment code of the AI-based dialog service from an assistant/bot service connected to the discovery service.

9. The non-transitory program storage medium of claim 1, wherein the deployment object further associates analytics scheduling information with the target application, and the operations further comprise deriving analytics from the extracted textual data according to the analytics scheduling information associated with the deployment object.

10. The non-transitory program storage medium of claim 9, wherein the operations further comprise rendering a report based on the derived analytics according to the analytics scheduling information associated with the deployment object.

11. The non-transitory program storage medium of claim 1, wherein the deployment object further associates notification or escalation data with the target application, the notification or escalation data including one or more notification or escalation triggers and one or more notification or escalation target endpoints, and the operations further comprise issuing a notification or escalation to the one or more notification or escalation target endpoints according to the notification or escalation data associated with the deployment object.

12. The non-transitory program storage medium of claim 11, wherein the one or more notification or escalation triggers comprise values of inputs selected from the group consisting of: customer sentiment, customer tone, number of dialog turns, and timers.

13. The non-transitory program storage medium of claim 12, wherein the notification or escalation target endpoints comprise automated outbound communications selected from the group consisting of short message service messages, text messages, instant messages, chat messages, virtual assistant messages, email messages, and phone calls.

14. The non-transitory program storage medium of claim 1, wherein the operations further comprise generating a Frequently Asked Questions and Answers (FAQ) dialog based on the assembled inquiries or inquiry responses.

15. The non-transitory program storage medium of claim 14, wherein the deployment object further associates FAQ preference data with the target application, the FAQ preference data including a preferred format for an automatically generated FAQ, and the FAQ dialog is generated according to the FAQ preference data.

16. The non-transitory program storage medium of claim 1, wherein the target application comprises a smartphone application, a web-based application, a customer relationship management system, a contact center system, a digital engagement platform, a social engagement timeline, or an in-car telemetry system.

17. A method of auto-provisioning AI-based dialog services for a plurality of target applications, the method comprising:

storing a plurality of dialog templates, each of the dialog templates including one or more sets of common inquiries or common inquiry responses;

generating a deployment object corresponding to a target application from among the plurality of target applications, the target application being for use in a particular industry, the deployment object comprising items of data related to the target application;

associating one or more of the dialog templates with the deployment object extracting textual data from the target application;

rendering the extracted textual data into JavaScript Object Notation;

assembling the extracted textual data into inquiries or inquiry responses based on tone and length and according to the one or more dialog templates associated with the deployment object to compile an AI training corpus;

periodically providing updates to the AI training corpus using periodic text, application and page crawling subroutines;

feeding the assembled inquiries or inquiry responses to a discovery service to make the AI training corpus searchable; and deploying an AI-based dialog service to the target application based on the AI training corpus.

18. A system for auto-provisioning AI-based dialog services for a plurality of target applications, the system comprising:

a template server for storing a plurality of dialog templates and generating a deployment object corresponding to a target application from among the plurality of target applications, the deployment object comprising items of data related to the target application, each of the dialog templates including one or more sets of common inquiries or common inquiry, the target application being for use in a particular industry, the template server associating one or more of the dialog templates with the deployment object;

a crawler for extracting textual data from the target application;

an algorithm server for rendering the extracted textual data into JavaScript Object Notation;

the algorithm server for assembling the extracted textual data into inquiries or inquiry responses based on tone and length and according to the one or more dialog templates associated with the deployment object to compile an AI training corpus and feeding the assembled inquiries or inquiry responses to a discovery service to make the AI training corpus searchable;

an automated scheduling subsystem which periodically provides updates to the AI training corpus using periodic text, application and page crawling subroutines; and a provisioning server for deploying an AI-based dialog service to the target application based on the AI training corpus.

* * * * *